US012736657B2

(12) United States Patent
Liu et al.

(10) Patent No.: US 12,736,657 B2
(45) Date of Patent: Sep. 15, 2026

(54) TARGET TRACKING METHOD AND APPARATUS

(71) Applicant: Yinwang Intelligent Technologies Co., Ltd., Shenzhen (CN)

(72) Inventors: Zhiyang Liu, Shanghai (CN); Jianle Ren, Shanghai (CN); Rong Zhou, Shanghai (CN); Wei Zhou, Shanghai (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 526 days.

(21) Appl. No.: 18/181,204

(22) Filed: Mar. 9, 2023

(65) Prior Publication Data

US 2023/0204755 A1 Jun. 29, 2023

Related U.S. Application Data

(63) Continuation of application No. PCT/CN2021/113337, filed on Aug. 18, 2021.

(30) Foreign Application Priority Data

Sep. 11, 2020 (CN) ........................ 202010953032.9

(51) Int. Cl.
*G01S 13/931* (2020.01)
*G01S 13/72* (2006.01)
(Continued)

(52) U.S. Cl.
CPC .......... *G01S 13/723* (2013.01); *G01S 13/867* (2013.01); *G01S 13/886* (2013.01); *G01S 13/931* (2013.01); *G01S 2013/9328* (2013.01)

(58) Field of Classification Search
CPC .... G01S 13/723; G01S 13/867; G01S 13/886; G01S 13/931; G01S 2013/9328;
(Continued)

(56) References Cited

U.S. PATENT DOCUMENTS 10,565,468 B2 * 2/2020 Schiffmann ............. G01S 13/42
2013/0335569 A1 * 12/2013 Einecke ................ G01S 13/867
348/148

FOREIGN PATENT DOCUMENTS

CN 102508246 A 6/2012
CN 106908783 A 6/2017
(Continued)

OTHER PUBLICATIONS

International Search Report and Written Opinion in International Appln. No. PCT/CN2021/113337, mailed on Oct. 28, 2021, 19 pages (with English translation).
(Continued)

*Primary Examiner* — Resha Desai
*Assistant Examiner* — Bongani Jabulani Mashele
(74) *Attorney, Agent, or Firm* — Fish & Richardson P.C.

(57) ABSTRACT

This disclosure provides a target tracking method and apparatus, relate to the field of data processing technologies, and may be used for security protection, assisted driving, and self-driving. The method includes: obtaining a camera target tracking result and a radar target tracking result; and obtaining a target tracking result based on the camera target tracking result and a target model corresponding to the radar target tracking result, where the target model indicates an association relationship between a target in the radar target tracking result and height information of the target.

20 Claims, 10 Drawing Sheets

(51) Int. Cl.
*G01S 13/86* (2006.01)
*G01S 13/88* (2006.01)

(58) Field of Classification Search
CPC .......... G01S 7/295; G01S 7/412; G01S 7/415; G01S 2013/9316; G01S 13/726; G01S 13/86; G01S 13/865
See application file for complete search history.

(56) References Cited

FOREIGN PATENT DOCUMENTS

| | | | | | |
|---|---|---|---|---|---|
| CN | 110246159 A | * | 9/2019 | ............. | G06T 7/246 |
| CN | 111257866 A | * | 6/2020 | ........... | G01S 13/867 |
| DE | 102018000517 A1 | * | 8/2018 | ............. | G01S 7/417 |

OTHER PUBLICATIONS

Extended European Search Report in European Appln No. 21865821.9, dated Jan. 18, 2024, 10 pages.

* cited by examiner

TARGET TRACKING METHOD AND APPARATUS

CROSS-REFERENCE TO RELATED APPLICATIONS

This application is a continuation of International Application No. PCT/CN2021/113337, filed on Aug. 18, 2021, which claims priority to Chinese Patent Application No. 202010953032.9, filed on Sep. 11, 2020. The disclosures of the aforementioned applications are hereby incorporated by reference in their entireties.

TECHNICAL FIELD

This application relates to the field of data processing technologies, and in particular, to a target tracking method and apparatus.

BACKGROUND

With social development, intelligent terminals such as an intelligent transportation device, a smart household device, and a robot are gradually entering people's daily lives. Sensors play a very important role in the intelligent terminals. Various sensors installed on the intelligent terminals, such as a millimeter-wave radar, a laser radar, an imaging radar, an ultrasonic radar, and a camera, enable the intelligent terminals to sense an ambient environment, collect data, identify and track a moving object, identify a static scenario such as a lane line and a signboard, and plan a route based on navigator and map data. For example, in the field of self-driving, security protection, or surveillance, target tracking may be performed based on a sensor, and a specific policy is implemented based on target tracking. For example, in the self-driving field, a driving policy may be formulated based on target tracking, and in the security protection or surveillance field, an alarm may be generated for an unsafe factor such as illegal intrusion based on target tracking.

In a related technology, there is a method for tracking a target based on a radar and a camera. For example, a location and a speed of the target may be detected by using each of the camera and the radar, and then an association algorithm is used to determine that a same target is determined when the location and the speed of the target in camera detection are similar to the location and the speed of the target in radar detection.

However, in the foregoing technology, when a same target is determined, a false association is easily generated, resulting in relatively low precision of target tracking.

SUMMARY

Embodiments of this application provide a target tracking method and apparatus, to improve precision of target tracking performed by using a radar and a camera.

According to a first aspect, an embodiment of this application provides a target tracking method, including: obtaining a camera target tracking result and a radar target tracking result; and obtaining a target tracking result based on the camera target tracking result and a target model corresponding to the radar target tracking result, where the target model indicates an association relationship between a target in the radar target tracking result and height information of the target. In this way, because the target model includes the height information of the target, when the camera target tracking result is associated with the radar target tracking result, the target tracking result detected by a radar may be combined with the height information of the target, so as to effectively expand a range of the target detected by the radar, and obtain an accurate target tracking result through association.

In a possible implementation, the method further includes: obtaining the height information of the target based on type information of the target in the radar target tracking result; and fusing the height information of the target and the target in the radar target tracking result to obtain the target model. In this way, a target model that can represent a location and a height of the target may be obtained, and subsequently, an accurate target tracking result may be obtained through association by using the target model.

In a possible implementation, there is a predefined or preset correspondence between the type information of the target and the height information of the target. In this way, the height information of the target can be conveniently obtained based on the type information of the target.

In a possible implementation, the obtaining a target tracking result based on the camera target tracking result and a target model corresponding to the radar target tracking result includes: projecting the target model into a camera coordinate system, to obtain a projected radar target tracking result; and obtaining a target tracking result based on the camera target tracking result and the projected radar target tracking result. In this way, an accurate target tracking result may be subsequently obtained in the camera coordinate system based on the camera target tracking result and the projected radar target tracking result.

In a possible implementation, the projecting the target model into a camera coordinate system includes: converting the target model into the camera coordinate system based on a preset or defined height conversion relationship, where different height information corresponds to different height conversion relationships, and the height conversion relationship is used to convert a target tracking result with a height in a radar coordinate system into the camera coordinate system. In this way, the target model can be conveniently converted into the camera coordinate system based on the height conversion relationship.

In a possible implementation, height information corresponding to different area types corresponds to different height conversion relationships. Different areas correspond to different horizontal lines. For example, visual heights of a same target in a low-lying area and a flat area are usually different. Therefore, different height conversion relationships are separately set for different areas, so that accurate conversion can be implemented when a target tracking result with a height in a radar coordinate system is converted into a camera coordinate system by using the height conversion relationship.

In a possible implementation, the area type includes one or more of an area with undulating ground, an area with a slope, or an area with flat ground. In this way, accurate conversion between coordinate systems can be implemented for common ground types.

In a possible implementation, the converting the target model into the camera coordinate system based on a preset or defined height conversion relationship includes: determining a target area type corresponding to the target model; and converting the target model into the camera coordinate system based on a target height conversion relationship that matches height information of the target model and that is in a height conversion relationship corresponding to the target area type.

In a possible implementation, the obtaining a target tracking result based on the camera target tracking result and the projected radar target tracking result includes: determining, based on an overlapping proportion between the camera target tracking result and the projected radar target tracking result, that the camera target tracking result and the projected radar target tracking result indicate a same target, where the overlapping proportion is greater than a first value. In this way, it can be conveniently and accurately determined, by using the overlapping proportion, that the camera target tracking result and the projected radar target tracking result indicate the same target.

In a possible implementation, the determining, based on an overlapping proportion between the camera target tracking result and the projected radar target tracking result, that the camera target tracking result and the projected radar target tracking result indicate a same target including: when the overlapping proportion is greater than the first value, and a location and/or a speed of an overlapping target in the camera target tracking result and a location and/or a speed of the overlapping target in the projected radar target tracking result meet a preset condition, determining that the camera target tracking result and the projected radar target tracking result indicate the same target. In this way, on the basis of calculating the overlapping proportion, it may be further determined, with reference to the location and/or the speed of the overlapping target, that the camera target tracking result and the projected radar target tracking result indicate the same target, so that more accurate determining can be implemented.

In a possible implementation, the preset condition includes: A difference between the location and/or the speed of the overlapping target in the camera target tracking result and the location and/or the speed of the overlapping target in the radar target tracking result is less than a second value.

In a possible implementation, the radar target tracking result is from an imaging radar, and the target model further includes size information of the target. In this way, an overlapping proportion between a visual bounding box, height information, and a size may be calculated at the same time. When the overlapping proportion is greater than or equal to a specific value, the targets are associated as a same target. Because the size is added, more accurate target association can be implemented compared with a millimeter-wave radar, thereby implementing more accurate target tracking.

In a possible implementation, the camera target tracking result includes a target bounding box, and the radar target tracking result includes a target point cloud. In this way, target tracking can be efficiently and accurately performed by using the target bounding box and the target point cloud.

According to a second aspect, an embodiment of this application provides a target tracking apparatus.

The target tracking apparatus may be a vehicle with a target tracking function, or another component with a target tracking function. The target tracking apparatus includes but is not limited to another sensor such as an in-vehicle terminal, an in-vehicle controller, an in-vehicle module, an in-vehicle module, an in-vehicle component, an in-vehicle chip, an in-vehicle unit, an in-vehicle radar, or an in-vehicle camera. The vehicle may implement the method provided in this application by using the in-vehicle terminal, the in-vehicle controller, the in-vehicle module, the in-vehicle module, the in-vehicle component, the in-vehicle unit, the in-vehicle radar or camera.

The target tracking apparatus may be an intelligent terminal, or disposed in another intelligent terminal that has a target tracking function in addition to a vehicle, or disposed in a component of the intelligent terminal. The intelligent terminal may be another terminal device such as an intelligent transportation device, a smart household device, or a robot. The target tracking apparatus includes but is not limited to an intelligent terminal or another sensor such as a controller, a chip, a radar, or a camera in the intelligent terminal, another component, or the like.

The target tracking apparatus may be a general-purpose device or a dedicated device. In specific implementation, the apparatus may further be a desktop computer, a portable computer, a network server, a palmtop computer (personal digital assistant, PDA), a mobile phone, a tablet computer, a wireless terminal device, an embedded device, or another device with a processing function. A type of the target tracking apparatus is not limited in this embodiment of this application.

Alternatively, the target tracking apparatus may be a chip or a processor with a processing function, and the target tracking apparatus may include at least one processor. The processor may be a single-core (single-CPU) processor, or may be a multi-core (multi-CPU) processor. The chip or processor with a processing function may be disposed in the sensor, or may not be disposed in the sensor, but is disposed at a receiving end of an output signal of the sensor. The processor includes but is not limited to at least one of a central processing unit (central processing unit, CPU), a graphics processing unit (graphics processing unit, GPU), a micro control unit (micro control unit, MCU), a microprocessor (micro processor unit, MPU), or a coprocessor.

Alternatively, the target tracking apparatus may be a terminal device, or may be a chip or a chip system in a terminal device. The target tracking apparatus may include a processing unit and a communications unit. When the target tracking apparatus is a terminal device, the processing unit may be a processor. The target tracking apparatus may further include a storage unit, and the storage unit may be a memory. The storage unit is configured to store an instruction, and the processing unit executes the instruction stored in the storage unit, so that the terminal device implements the target tracking method described in any one of the first aspect or the possible implementations of the first aspect. When the target tracking apparatus is a chip or a chip system in the terminal device, the processing unit may be a processor. The processing unit executes the instruction stored in the storage unit, so that the terminal device implements the target tracking method described in any one of the first aspect or the possible implementations of the first aspect. The storage unit may be a storage unit (for example, a register or a cache) in the chip, or may be a storage unit (for example, a read-only memory or a random access memory) that is in the terminal device and that is outside the chip.

For example, the communications unit is configured to obtain a camera target tracking result and a radar target tracking result. The processing unit is configured to obtain a target tracking result based on the camera target tracking result and a target model corresponding to the radar target tracking result, where the target model indicates an association relationship between a target in the radar target tracking result and height information of the target.

In a possible implementation, the processing unit is further configured to obtain the height information of the target based on type information of the target in the radar target tracking result; and fuse the height information of the target and the target in the radar target tracking result to obtain the target model.

In a possible implementation, there is a predefined or preset correspondence between the type information of the target and the height information of the target.

In a possible implementation, the processing unit is specifically configured to: project the target model into a camera coordinate system, to obtain a projected radar target tracking result; and obtain a target tracking result based on the camera target tracking result and the projected radar target tracking result.

In a possible implementation, the processing unit is specifically configured to convert the target model into the camera coordinate system based on a preset or defined height conversion relationship, where different height information corresponds to different height conversion relationships, and the height conversion relationship is used to convert a target tracking result with a height in a radar coordinate system into the camera coordinate system.

In a possible implementation, height information corresponding to different area types corresponds to different height conversion relationships.

In a possible implementation, the area type includes one or more of an area with undulating ground, an area with a slope, or an area with flat ground.

In a possible implementation, the processing unit is specifically configured to determine a target area type corresponding to the target model; and convert the target model into the camera coordinate system based on a target height conversion relationship that matches height information of the target model and that is in a height conversion relationship corresponding to the target area type.

In a possible implementation, the processing unit is specifically configured to determine, based on an overlapping proportion between the camera target tracking result and the projected radar target tracking result, that the camera target tracking result and the projected radar target tracking result indicate a same target, where the overlapping proportion is greater than a first value.

In a possible implementation, the processing unit is specifically configured to: when the overlapping proportion is greater than the first value, and a location and/or a speed of an overlapping target in the camera target tracking result and a location and/or a speed of the overlapping target in the projected radar target tracking result meet a preset condition, determine that the camera target tracking result and the projected radar target tracking result indicate the same target.

In a possible implementation, the preset condition includes: A difference between the location and/or the speed of the overlapping target in the camera target tracking result and the location and/or the speed of the overlapping target in the radar target tracking result is less than a second value.

In a possible implementation, the radar target tracking result is from an imaging radar, and the target model further includes size information of the target.

In a possible implementation, the camera target tracking result includes a target bounding box, and the radar target tracking result includes a target point cloud.

According to a third aspect, an embodiment of this application further provides a sensor system, configured to provide a target tracking function for a vehicle. The sensor system includes at least one target tracking apparatus mentioned in the foregoing embodiments of this application, and other sensors such as a camera and a radar. The at least one sensor apparatus in the system may be integrated into an entire system or a device, or the at least one sensor apparatus in the system may be independently disposed as a component or an apparatus.

According to a fourth aspect, an embodiment of this application further provides a system, applied to unmanned driving or intelligent driving. The system includes at least one of the target tracking apparatus, the camera, the radar, and other sensors mentioned in the foregoing embodiments of this application. At least one apparatus in the system may be integrated into an entire system or a device, or at least one apparatus in the system may be independently disposed as a component or an apparatus.

Further, any of the above systems may interact with a central controller of the vehicle to provide detection and/or fusion information for decision or control of driving of the vehicle.

According to a fifth aspect, an embodiment of this application further provides a terminal, where the terminal includes at least one target tracking apparatus mentioned in the foregoing embodiments of this application or any one of the foregoing systems. Further, the terminal may be a smart household device, a smart manufacturing device, a smart industrial device, an intelligent transportation device (including an unmanned aerial vehicle, a vehicle, and the like), or the like.

According to a sixth aspect, an embodiment of this application further provides a chip, including at least one processor and an interface, where the interface is configured to provide a program instruction or data for the at least one processor, and the at least one processor is configured to execute the program instruction, to implement any method in the first aspect or the possible implementations of the first aspect.

According to a seventh aspect, an embodiment of this application provides a target tracking apparatus, including at least one processor, configured to invoke a program in a memory, to implement any method in the first aspect or any possible implementation of the first aspect.

According to an eighth aspect, an embodiment of this application provides a target tracking apparatus, including at least one processor and an interface circuit. The interface circuit is configured to provide information input and/or information output for the at least one processor. The at least one processor is configured to run a code instruction, to implement any method in the first aspect or any possible implementation of the first aspect.

According to a ninth aspect, an embodiment of this application provides a computer-readable storage medium. The computer readable storage medium stores an instruction, and when the instruction is executed, the method in the first aspect or any possible implementation of the first aspect is implemented.

It should be understood that the second aspect to the ninth aspect of this application correspond to the technical solutions of the first aspect of this application, and beneficial effects achieved by the aspects and the corresponding feasible implementations are similar. Details are not described again.

DESCRIPTION OF EMBODIMENTS

Figure 1:
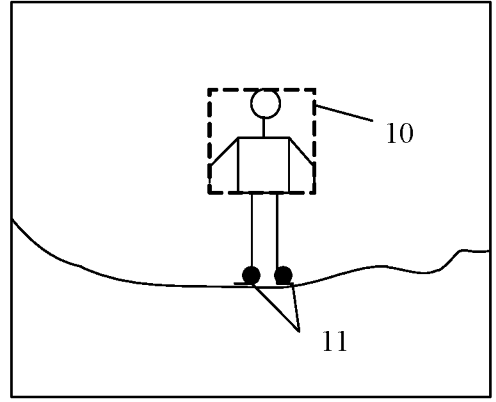
FIG. 1 is a schematic diagram of determining a target based on a visual bounding box and a radar point cloud.

In order to clearly describe the technical solutions in embodiments of this application, in the embodiments of this application, words such as “first” and “second” are used to distinguish between same or similar items that have basically a same function and effect. For example, a first value and a second value are merely intended to distinguish between different values, but not to limit a sequential order thereof. A person skilled in the art may understand that words such as “first” and “second” do not limit a quantity and an execution order, and the words “first” and “second” are not necessarily different.

It should be noted that, in this application, words such as “example” or “for example” are used for representing giving an example, an illustration, or a description. Any embodiment or design scheme described as an “example” or “for example” in this application should not be explained as being more preferred or having more advantages than another embodiment or design scheme. Exactly, use of the word “example”, “for example”, or the like is intended to present a related concept in a specific manner.

In this application, at least one means one or more, and a plurality of means two or more. In this application, “and/or” is an association relationship describing associated objects, and indicates that three relationships may exist. For example, A and/or B may indicate that only A exists, both A and B exist, and only B exists. A and B each may be singular or plural. The character “/” generally indicates an “or” relationship between the associated objects. “At least one of the following items (pieces)” or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

Radar-based target tracking and/or camera-based target tracking are possible manners of implementing target tracking.

A radar (radar) can be a radio-detection-based device. The radar can measure locations of targets in the air, on the ground, and on water, which may also be called radiolocation. For example, the radar may send a radio wave to the air by using a directional antenna. After the radio wave meets a target, the radio wave is reflected back and accepted by the radar. Distance data of the target is obtained by measuring a time elapsed by the radio wave during propagation in the air, and angle data of the target is determined according to an antenna beam direction, thereby implementing target tracking. Generally, the radar can obtain accurate speed and location information and has a long field of view. However, in a clutter environment, an effect of radar target tracking is poor due to the influence of clutter.

A camera (camera) may project an optical image generated for a scene by using a lens onto a surface of an image sensor, convert the optical image into an electrical signal, and convert the electrical signal into a digital image signal after digital-to-analog conversion. The digital image signal may be processed in a digital signal processor (digital signal processing, DSP) chip. Target classification may be performed on an image photographed by using the camera, and a location and/or a speed of the target may be detected, so as to implement target tracking. However, in an environment with relatively weak light, an effect of an image photographed by the camera may be relatively poor, resulting in a relatively poor target tracking effect.

A result obtained by radar-based target tracking is fused with a result obtained by camera-based target tracking (referred to as radar-camera fusion), so that respective advantages of the radar and the camera can be brought into full play, and relatively accurate target tracking can be implemented. Implementation of the radar-camera fusion may include a target-level radar-camera fusion (object-level data fusion) method and a measurement-level radar-camera fusion (data-level data fusion) method.

In a possible implementation, the target-level radar-camera fusion method includes: obtaining a visual bounding box (bounding box) of a target by using a camera, converting the visual bounding box by using a conversion matrix of camera coordinates (which may also be referred to as visual coordinates) and radar coordinates (which may also be referred to as top view coordinates), to obtain a location and a speed of the target at radar coordinates; obtaining a target by using a radar detection point cloud, and obtaining a location and a speed of the target at radar coordinates; associating the target detected by the radar with the target detected by the camera by using an association algorithm related to the location and the speed of the target, to confirm a same target; and obtaining the location and the speed of the target after fusion by estimating the status of the target.

In a possible implementation, the measurement-level radar-camera fusion method includes: projecting, by using a point cloud (or referred to as radar point cloud, point cloud data, or the like) of a target detected by a radar, the point cloud detected by the radar into a camera coordinate system; associating, by using a visual bounding box of the target obtained by the camera and an association algorithm, a projection of the radar point cloud with the visual bounding box obtained by the camera, to determine a same target; and estimating a status of the target to obtain a location and a speed of the target after fusion.

However, in the foregoing implementation, in the target-level fusion method and the measurement-level fusion method, when the same target is determined, location information needs to be used to associate the target obtained by the camera with the target obtained by the radar. The location information of the target obtained based on the camera usually depends on precision of a bottom edge of the visual bounding box, but precision of the bottom edge of the visual bounding box may not be high due to reasons such as weather and environment. The location information of the target obtained based on the radar usually depends on a target point cloud. However, in an environment such as clutter or undulating ground, the precision of the target point cloud may not be high, which is prone to a false association.

For example, FIG. 1 is a schematic diagram of determining a target based on a visual bounding box and a radar point cloud. As shown in FIG. 1, possibly, because a leg color of a person is similar to a ground color, and the like, when a visual bounding box 10 frames the person, a bottom frame of the visual bounding box 10 frames on an upper body of the person, and a radar point cloud 11 may detect a lower body (for example, a foot) of the person. In this case, during target fusion, a location difference between the visual bounding box 10 and the radar point cloud 11 is relatively long, the target framed by the visual bounding box 10 and the target determined by the radar point cloud 11 may not be associated as a same target, resulting in a false association.

Based on this, in the target tracking method in this embodiment of this application, when a camera target tracking result is associated with a radar target tracking result, height information of the target is introduced into the radar target tracking result. For example, a target model indicating an association relationship between the target in the radar target tracking result and the height information of the target is obtained. When the camera target tracking result is associated with the radar target tracking result, a target tracking result may be obtained based on the camera target tracking result and the target model. Because the target model includes the height information of the target, a range of the target detected by the radar can be effectively expanded, and then an accurate target tracking result can be obtained through association.

Figure 2:
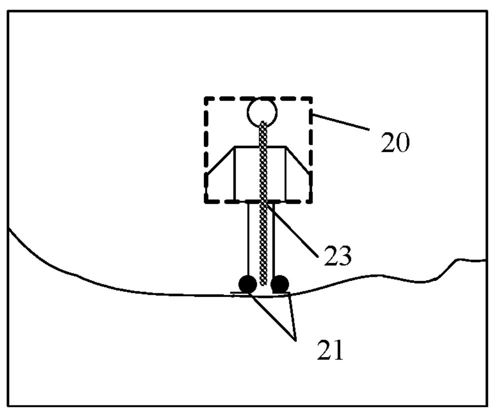
FIG. 2 is a schematic diagram of determining a target based on a visual bounding box and a radar point cloud according to an embodiment of this application.

For example, FIG. 2 is a schematic diagram of determining a target based on a visual bounding box and a radar point cloud according to an embodiment of this application. As shown in FIG. 2, because a leg color of a person is similar to a ground color, or the like, when a visual bounding box 20 frames the person, a bottom edge of the visual boundary box 20 frames on an upper body of the person, and a radar point cloud 21 may detect a lower body (for example, a foot) of the person. However, in this embodiment of this application, height information of the person is introduced, for example, a line segment 23 used to represent height information may be determined, because there are a relatively large quantity of overlapping parts between the visual bounding box 20 and the line segment 23 used to represent the height information, it is very likely that the target framed by the visual bounding box 20 and the target determined by the radar point cloud 21 are associated as a same target. Therefore, in this embodiment of this application, target association no longer depends on precision of the bottom edge of the visual bounding box and precision of the radar point cloud. Regardless of an environment with relatively poor light (for example, at night), or relatively low precision of the bottom edge of the visual bounding box (for example, only an upper body of a person is framed), or inaccurate point cloud data detected by the radar in a clutter environment, an accurate target can be associated based on the height information and the visual bounding box, thereby improving accuracy and stability of the associated target.

In a possible implementation, the target tracking method in this embodiment of this application may be applied to a scenario such as self-driving, security protection, or surveillance. For example, in a self-driving scenario, a target such as an obstacle may be tracked based on the target tracking method in this embodiment of this application, and then a self-driving policy is formulated based on the target tracking. For example, in a security protection or surveillance scenario, a target such as a person may be tracked based on the target tracking method in this embodiment of this application, and then an alarm is generated for an insecure factor such as illegal intrusion based on the target tracking.

Figure 3:
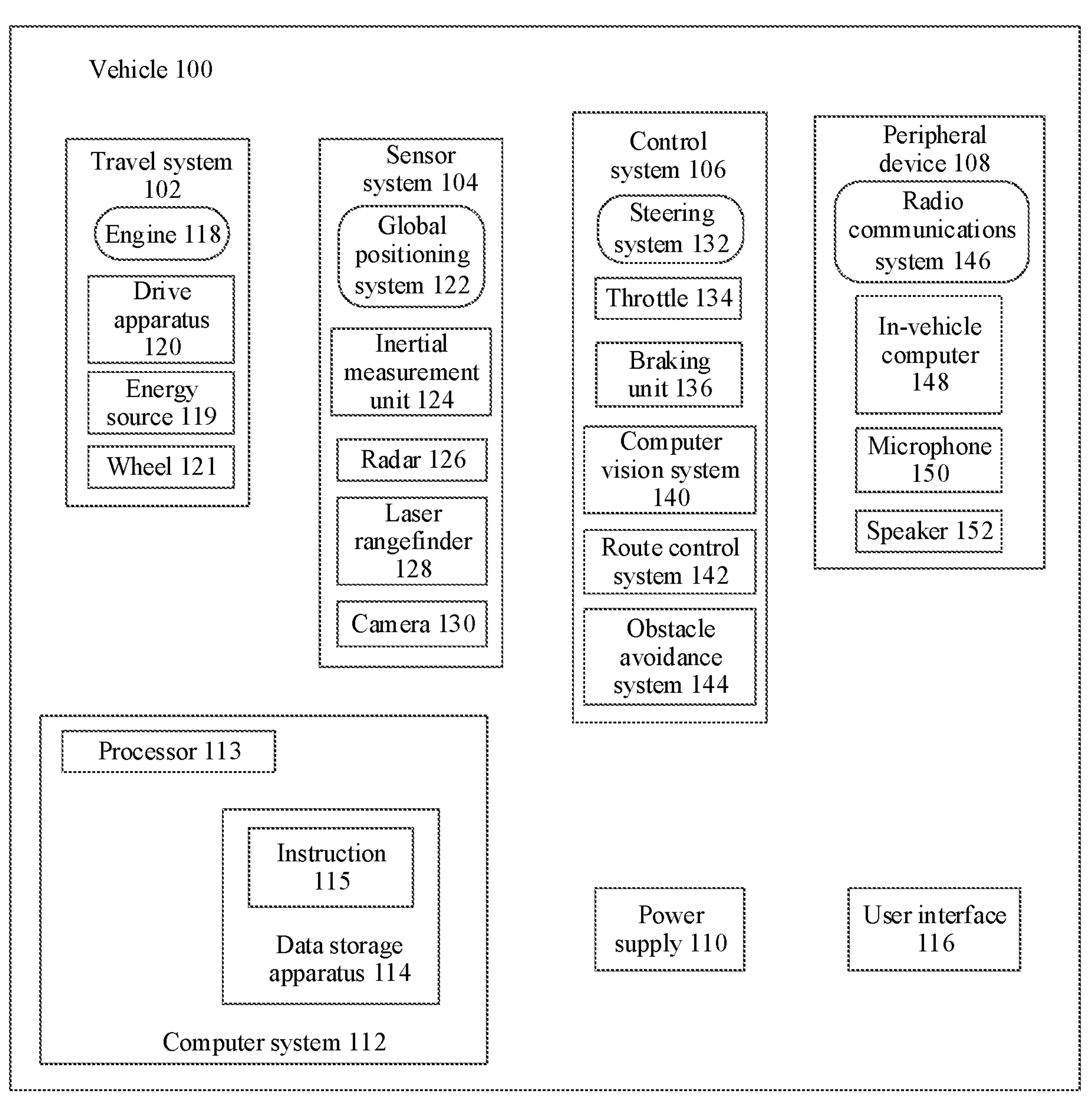
FIG. 3 is a functional block diagram of a vehicle 100 according to an embodiment of this application.

For example, in a self-driving scenario, the target tracking method in this embodiment of this application may be applied to a vehicle, a chip in a vehicle, or the like. For example, FIG. 3 is a functional block diagram of a vehicle 100 according to an embodiment of this application. In an embodiment, the vehicle 100 is configured to be in a fully self-driving mode or a partially self-driving mode. For example, if the vehicle 100 is configured to be in the partially self-driving mode, in the self-driving mode, the vehicle 100 may further determine a current situation of the vehicle and an ambient environment through manual operations, for example, determine a possible behavior of at least one another vehicle in the ambient environment, determining a confidence level corresponding to a possibility that the another vehicle is going to execute the possible behavior, and controlling the vehicle 100 based on the determined information. For example, when the vehicle 100 is in a fully self-driving mode, the vehicle 100 may be set to automatically perform a driving-related operation without interacting with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of components. In addition, all the subsystems and components of the vehicle 100 may be interconnected in a wired or wireless manner.

The travel system 102 may include a component providing power to the vehicle 100 for moving. In an embodiment, the travel system 102 may include an engine 118, an energy source 119, a drive apparatus 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of energy sources 119 include gasoline, diesel, other petroleum-based fuels, propane, other compressed gas-based fuels, anhydrous alcohol, solar panels, batteries, or other sources of electricity. The energy source 119 may also provide energy to another system of the vehicle 100.

The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that can sense information about the ambient environment of the vehicle 100. For example, the sensor system 104 may include a positioning system 122 (the positioning system may be a GPS system, a BeiDou system, or another positioning system), an inertial measurement unit (inertial measurement unit, IMU) 124, a radar 126, a laser rangefinder 128, and a camera 130. The sensor system 104 may further include a sensor (for example, an in-vehicle air quality monitor, a fuel gauge, or an engine oil thermometer) of an internal system of the monitored vehicle 100. Sensor data from one or more of these sensors can be used to detect an object and corresponding features (a position, a shape, a direction, a speed, and the like) of the object. Such detection and recognition are key functions of a safe operation of the self-driving vehicle 100.

The positioning system 122 may be configured to estimate a geographic location of the vehicle 100. The IMU 124 is configured to sense a location and a heading change of the vehicle 100 based on an inertial acceleration. In an embodiment, the IMU 124 may be a combination of an accelerometer and a gyroscope.

The radar 126 may sense an object in the ambient environment of the vehicle 100 through a radio signal. In some embodiments, in addition to sensing an object, the radar 126 may further be configured to sense a speed and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and other system components.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various components, including a steering system 132, a throttle 134, a braking unit 136, a sensor fusion algorithm 138, a computer vision system 140, a route control system 142, and an obstacle avoidance system 144.

The steering system 132 may be operated to adjust a moving direction of the vehicle 100. For example, in an embodiment, the steering system 132 may be a steering wheel system.

The throttle 134 is configured to control an operating speed of the engine 118 and further control a speed of the vehicle 100.

The braking unit 136 is configured to control the vehicle 100 to decelerate. The braking unit 136 may use friction to slow down the wheel 121. In another embodiment, the braking unit 136 may convert kinetic energy of the wheel 121 into a current. Alternatively, the braking unit 136 may reduce a rotational speed of the wheel 121 in another form to control the speed of the vehicle 100.

The computer vision system 140 may be operated to process and analyze an image captured by the camera 130, to recognize an object and/or a feature in the ambient environment of the vehicle 100. The object and/or the feature may include a traffic signal, a road boundary, and an obstacle. The computer vision system 140 may use an object recognition algorithm, a structure from motion (structure from motion, SFM) algorithm, video tracking, and another computer vision technology. In some embodiments, the computer vision system 140 may be configured to draw a map for an environment, track an object, estimate a speed of the object, and the like.

The route control system 142 is configured to determine a driving route of the vehicle 100. In some embodiments, the route control system 142 may combine data from the sensor 138, a global positioning system (global positioning system, GPS) 122, and one or more predetermined maps to determine the travel route of the vehicle 100.

The obstacle avoidance system 144 is configured to identify, evaluate, and avoid or otherwise bypass a potential obstacle in the environment of the vehicle 100.

Certainly, in an example, the control system 106 may add or alternatively include components in addition to those shown and described. Alternatively, the control system 106 may delete some of the foregoing components.

The vehicle 100 interacts with an external sensor, another vehicle, another computer system, or a user by using the peripheral device 108. The peripheral device 108 may include a radio communications system 146, an in-vehicle computer 148, a microphone 150, and/or a speaker 152.

In some embodiments, the peripheral device 108 provides a means for a user of the vehicle 100 to interact with the user interface 116. For example, the in-vehicle computer 148 may provide information to the user of the vehicle 100. The user interface 116 may further operate the in-vehicle computer 148 to receive an input from the user. The in-vehicle computer 148 may perform an operation by using a touchscreen. In another case, the peripheral device 108 may provide a means for the vehicle 100 to communicate with another device located in the vehicle. For example, the microphone 150 may receive audio (for example, a voice command or another audio input) from the user of the vehicle 100. Likewise, the speaker 152 may output audio to the user of the vehicle 100.

In a possible implementation, a display screen of the in-vehicle computer 148 may further display a target obtained through tracking based on the target tracking algorithm in this embodiment of this application, so that the user can sense an environment around the vehicle on the display screen.

The radio communications system 146 may wirelessly communicate with one or more devices directly or through a communications network. For example, the radio communications system 146 may use 3G cellular communications, such as code division multiple access (code division multiple access, CDMA), EVDO, global system for mobile communications (global system for mobile communications, GSM)/general packet radio service (general packet radio service, GPRS), or 4G cellular communications, such as LTE, or a 5G cellular network to perform communication. The radio communications system 146 may communicate with a wireless local area network (wireless local area network, WLAN) using wireless fidelity (wireless fidelity, Wi-Fi). In some embodiments, the radio communications system 146 may directly communicate with a device through an infrared link, Bluetooth, or a ZigBee protocol (ZigBee). Other wireless protocols, for example, various vehicle communications systems, such as the radio communications system 146, may include one or more dedicated short-range communications (dedicated short-range communications, DSRC) devices, and these devices may include public and/or private data communication between the vehicle and/or roadside stations.

The power supply 110 may provide power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all of functions of the vehicle 100 are controlled by the computer system 112. The computer system 112 may include at least one processor 113. The processor 113 executes instructions 115 stored in a non-transitory computer-readable medium such as a data storage apparatus 114. The computer system 112 may alternatively be a plurality of computing devices that control an individual component or a subsystem of the vehicle 100 in a distributed manner.

The processor 113 may be any conventional processor, such as a commercially available central processing unit (central processing unit, CPU). Alternatively, the processor may be an application-specific integrated circuit (application-specific integrated circuit, ASIC) for specialized applications or other dedicated devices such as a hardware-based processor. Although FIG. 3 functionally illustrates other components of the processor, the memory, and the computer system 112 in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a housing different from that of the computer. Thus, it is understood that a reference to the processor or the computer includes a reference to a set of processors or computers or memories that may or may not operate in parallel. Different from using a single processor to perform the steps described herein, some components, such as a steering component and a deceleration component, each may include a respective processor that performs only computation related to a component-specific function.

In various aspects described herein, the processor may be located far away from the vehicle and wirelessly communicate with the vehicle. In another aspect, some processes described herein are performed on a processor disposed inside the vehicle, while others are performed by a remote processor, including performing steps necessary for single manipulation.

In some embodiments, the data storage apparatus 114 may include the instruction 115 (for example, program logic), and the instruction 115 may be executed by the processor 113 to perform various functions of the vehicle 100, including the functions described above. The data storage apparatus 114 may further include additional instructions, including instructions for sending data to, receiving data from, interacting with, and/or controlling one or more of the travel system 102, the sensor system 104, the control system 106, and the peripheral device 108.

In addition to the instructions 115, the data storage apparatus 114 may further store data, such as a road map, route information, a location, a direction, a speed, and other vehicle data of the vehicle, and other information. Such information may be used by the vehicle 100 and the computer system 112 when the vehicle 100 operates in an autonomous mode, a semi-autonomous mode, and/or a manual mode.

The user interface 116 is used to provide information for or receive information from the user of the vehicle 100. Optionally, the user interface 116 may include one or more input/output devices in a set of peripheral devices 108, for example, the radio communications system 146, the in-vehicle computer 148, the microphone 150, and the speaker 152.

The computer system 112 may control the functions of the vehicle 100 based on inputs received from various subsystems (for example, the travel system 102, the sensor system 104, and the control system 106) and from the user interface 116. For example, the computer system 112 may use an input from the control system 106 to control the steering unit 132 to avoid an obstacle detected by the sensor system 104 and the obstacle avoidance system 144. In some embodiments, the computer system 112 may be operated to provide control over many aspects of the vehicle 100 and the subsystems of the vehicle 100.

Optionally, one or more of the foregoing components may be installed separately from or associated with the vehicle 100. For example, the data storage apparatus 114 may exist partially or completely separate from the vehicle 100. The foregoing components may be communicatively coupled together in a wired and/or wireless manner.

Optionally, the foregoing components are merely examples. In actual application, components in the foregoing modules may be added or deleted based on an actual requirement. FIG. 3 should not be understood as a limitation on this embodiment of this application.

A self-driving vehicle moving on a road, for example, the foregoing vehicle 100, may track an object in an ambient environment of the self-driving vehicle according to the target tracking method in this embodiment of this application, to determine adjustment on a current speed, a driving route, or the like of the self-driving vehicle. The object may be another vehicle, a traffic control device, or another type of object.

In addition to providing an instruction for adjusting a speed or a driving route of the self-driving vehicle, the computing device may further provide an instruction for modifying a steering angle of the vehicle 100, so that the self-driving vehicle follows a given track and/or maintains a safe horizontal and vertical distance from an obstacle (for example, a vehicle in an adjacent lane on a road) near the self-driving vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 4:
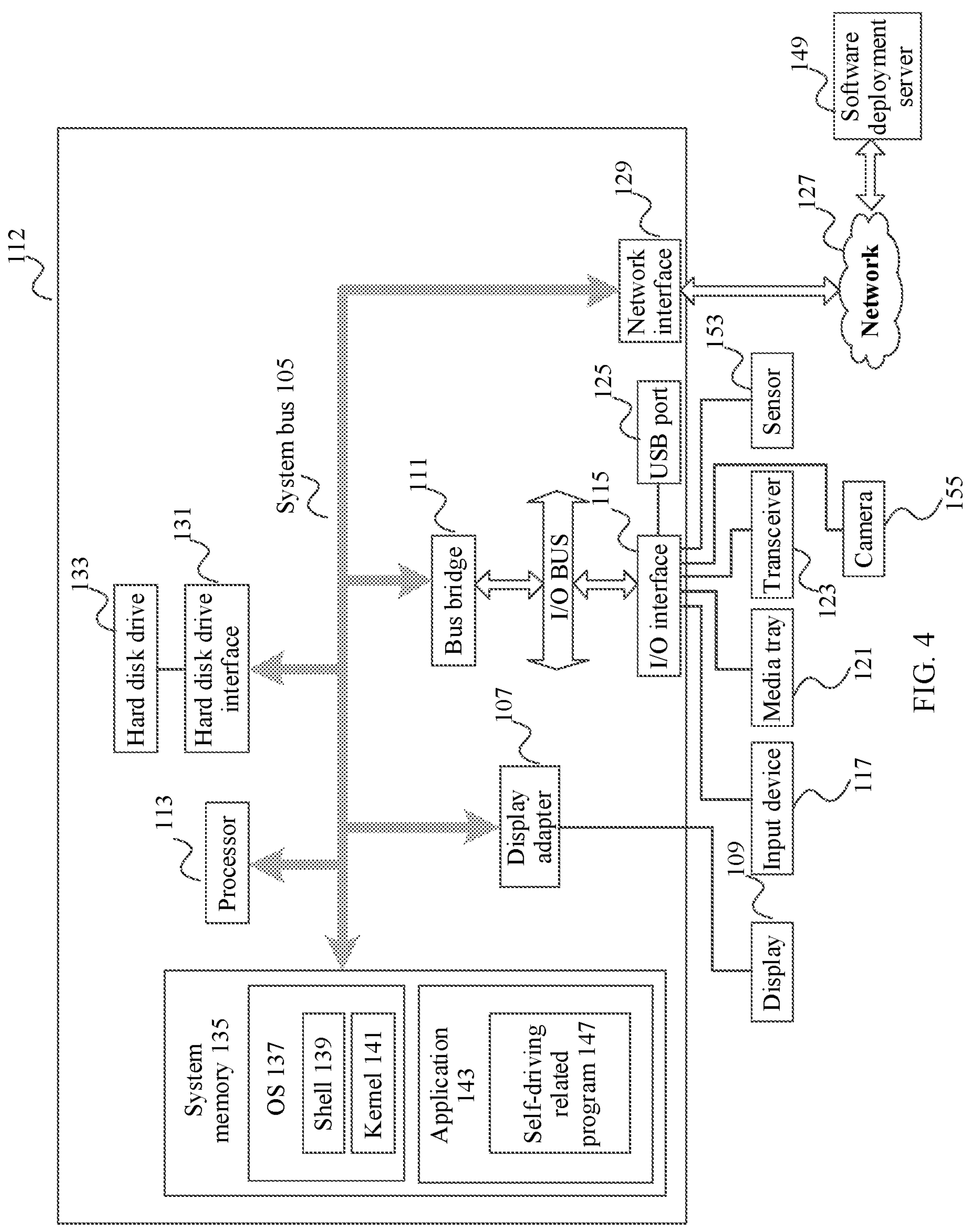
FIG. 4 is a schematic diagram of a structure of the computer system in FIG. 3.

FIG. 4 is a schematic diagram of a structure of the computer system 112 in FIG. 3. As shown in FIG. 4, the computer system 112 includes a processor 113, and the processor 113 is coupled to a system bus 105. The processor 113 may be one or more processors, and each processor may include one or more processor cores. A display adapter (video adapter) 107, where the display adapter 107 may drive a display 109, and the display 109 is coupled to the system bus 105. The system bus 105 is coupled to an input/output (I/O) bus through a bus bridge 111. An I/O interface 115 is coupled to the I/O bus. The I/O interface 115 communicates with a plurality of I/O devices, for example, an input device 117 (for example, a keyboard, a mouse, and a touchscreen) and a media tray (media tray) 121 (for example, a CD-ROM and a multimedia interface). A transceiver 123 (which can send and/or receive a radio communications signal), a camera 155 (which can capture static and dynamic digital video images), and an external USB interface 125 are further included. Optionally, an interface connected to the I/O interface 115 may be a universal serial bus (universal serial bus, USB) interface.

The processor 113 may be any conventional processor, including a reduced instruction set computing (RISC) processor, a complex instruction set computing (CISC) processor, or a combination thereof. Optionally, the processor may be a dedicated apparatus such as an application-specific integrated circuit (ASIC). Optionally, the processor 113 may be a neural-network processor or a combination of the neural-network processor and the foregoing conventional processor.

Optionally, in various embodiments described herein, the computer system may be located away from a self-driving vehicle, and may wirelessly communicate with the self-driving vehicle. In another aspect, some of processes described herein are performed on a processor disposed in the self-driving vehicle, and others are performed by a remote processor, including taking an action required to perform a single manipulation.

The computer system 112 may communicate with a software deployment server 149 through a network interface 129. The network interface 129 is a hardware network interface, for example, a network adapter. A network 127 may be an external network, such as the Internet; or may be an internal network, such as the Ethernet or a virtual private network (VPN). Optionally, the network 127 may alternatively be a wireless network, for example, a Wi-Fi network or a cellular network.

A hard disk drive interface 131 is coupled to the system bus 105. The hard disk drive interface 131 is connected to a hard disk drive 133. The system memory 135 is coupled to the system bus 105. Software running in the system memory 135 may include an operating system (operating system, OS) 137 and an application 143 of the computer system 112.

The operating system includes a shell 139 and a kernel (kernel) 141. The shell 139 is an interface between a user and the kernel (kernel) of the operating system. The shell is an outermost layer of the operating system. The shell manages interaction between the user and the operating system: waiting for an input of the user, interpreting the input of the user for the operating system, and processing various outputs of the operating system.

The kernel 141 includes parts of the operating system that are used for managing a memory, a file, a peripheral device, and a system resource. The kernel 141 directly interacts with hardware. The kernel 141 of the operating system usually runs processes, provides inter-process communication, and provides CPU time slice management, interruption, memory management, I/O management, and the like.

The application 141 includes related programs for controlling self-driving of the vehicle, for example, a program for managing interaction between the self-driving vehicle and an obstacle on a road, a program for controlling a route or a speed of the self-driving, or a program for controlling interaction between the self-driving and another self-driving on the road. The application 141 may be on a system of the software deployment server (deploying server) 149. In one embodiment, when the application 141 needs to be executed, the computer system may download the application 143 from the deploying server 149.

A sensor 153 is associated with the computer system. The sensor 153 is configured to detect an ambient environment of the computer system 112. For example, the sensor 153 can detect animals, vehicles, obstacles, pedestrian crosswalks, and the like. Further, the sensor can detect ambient environments of the animals, the vehicles, the obstacles, or the pedestrian crosswalks. For example, the sensor can detect the ambient environment of animals such as other animals in the ambient environment, a weather condition, and brightness of the ambient environment. Optionally, if the computer system 112 is located on the self-driving vehicle, the sensor may be a camera, an infrared sensor, a chemical detector, a microphone, or the like.

Figure 5:
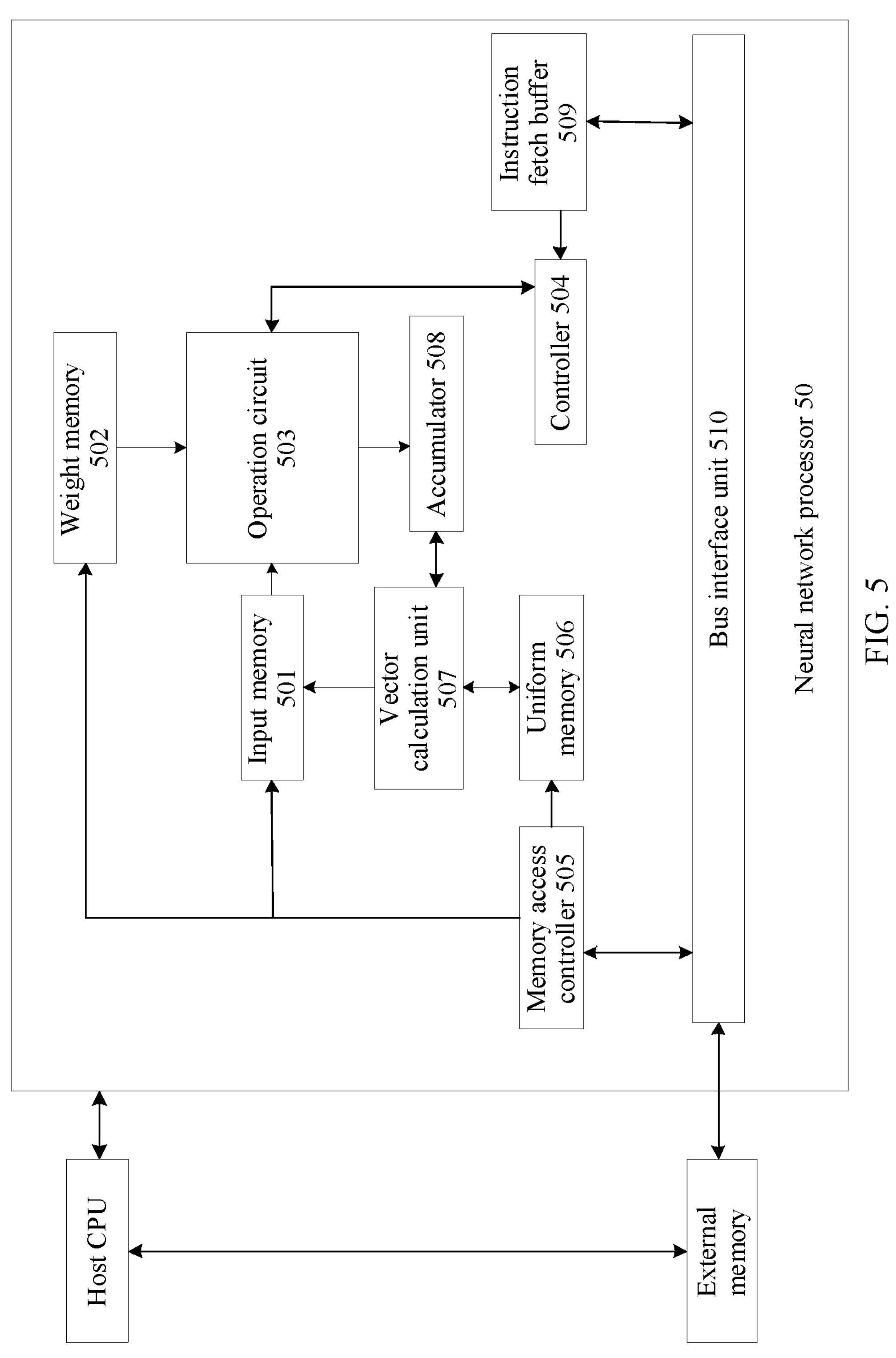
FIG. 5 is a schematic diagram of a hardware structure of a chip according to an embodiment of this application.

FIG. 5 is a schematic diagram of a hardware structure of a chip according to an embodiment of this application. As shown in FIG. 5, the chip may include a neural network processor 50. The chip may be applied to the vehicle shown in FIG. 3 or the computer system shown in FIG. 4.

The neural network processor 50 may be any processor suitable for large-scale exclusive OR operation processing, for example, a neural-network processing unit (neural network processing unit, NPU), a tensor processing unit (tensor processing unit, TPU), or a graphics processing unit (graphics processing unit, GPU). The NPU is used as an example. The NPU may be mounted, as a coprocessor, onto a host CPU (host CPU), and the host CPU allocates a task to the NPU. A core part of the NPU is an operation circuit 503. The controller 504 controls the operation circuit 503 to extract matrix data in the memories (501 and 502) and perform a multiply-add operation.

In some implementations, the operation circuit 503 includes a plurality of processing units (process engine, PE). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 obtains weight data of the matrix B from a weight memory 502, and caches the weight data on each PE in the operation circuit 503. The operation circuit 503 obtains input data of the matrix A from the input memory 501, performs a matrix operation on the input data of the matrix A and the weight data of the matrix B, and stores an obtained partial result or final result of the matrices in an accumulator (accumulator) 508.

A uniform memory 506 is configured to store input data and output data. The weight data is transferred to the weight memory 502 directly through a direct memory access controller (direct memory access controller, DMAC) 505. The input data is also transferred to the uniform memory 506 by using the DMAC.

A bus interface unit (bus interface unit, BIU) 510 is configured to implement interaction between the DMAC and an instruction fetch buffer (instruction fetch buffer) 509. The bus interface unit 501 is further used by the instruction fetch buffer 509 to obtain an instruction from an external memory. The bus interface unit 501 is further used by the memory access controller 505 to obtain original data of the input matrix A or the weight matrix B from the external memory.

The DMAC is mainly configured to migrate input data in the external memory DDR to the uniform memory 506, or migrate weight data to the weight memory 502, or migrate input data to the input memory 501.

A vector calculation unit 507 includes a plurality of operation processing units, and performs further processing, for example, vector multiplication, vector addition, an exponential operation, a logarithmic operation, or a magnitude comparison, on an output of the operation circuit 503 if necessary. The vector calculation unit 507 is mainly used for calculation at non-convolution layers or fully connected layers (fully connected layers, FC) in a neural network, and may specifically process calculation for pooling (pooling), normalization (normalization), and the like. For example, the vector calculation unit 507 may apply a non-linear function to the output, for example, a vector of an accumulated value, of the operation circuit 503, so as to generate an activation value. In some implementations, the vector calculation unit 507 generates a normalized value, a combined value, or both a normalized value and a combined value.

In some implementations, the vector calculation unit 507 stores a processed vector in the uniform memory 506. In some implementations, a vector processed by the vector calculation unit 507 can be used as an activation input of the operation circuit 503.

The instruction fetch buffer (instruction fetch buffer) 509 connected to the controller 504 is configured to store instructions used by the controller 504.

All the uniform memory 506, the input memory 501, the weight memory 502, and the instruction fetch buffer 509 are on-chip memories. The external memory is independent of the NPU hardware architecture.

For example, in a security protection or surveillance scenario, the target tracking method in this embodiment of this application may be applied to an electronic device. The electronic device may be a terminal device, a server, a chip, or the like that has a computing capability. The terminal device may include a mobile phone, a computer, a tablet, or the like. For example, FIG. 6 is a schematic diagram of a scenario in which a target tracking method according to an embodiment of this application is applied to security protection or surveillance.

Figure 6:
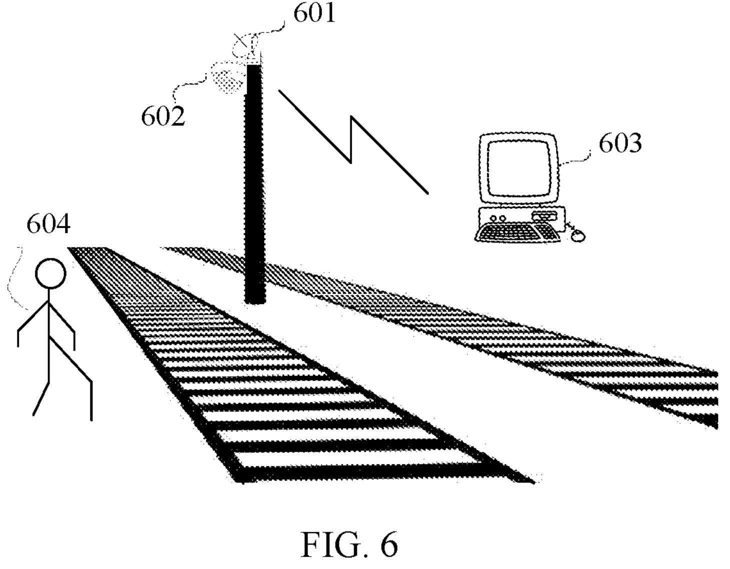
FIG. 6 is a schematic diagram of an application scenario according to an embodiment of this application.

As shown in FIG. 6, in a security protection or surveillance scenario, a radar 601, a camera 602, and an electronic device 603 may be included. The radar 601 and the camera 602 may be disposed at positions such as a utility pole, so that the radar 601 and the camera 602 have a relatively good field of view. The radar 601 and the camera 602 may separately communicate with the electronic device 603. Point cloud data measured by the radar 601 and images collected by the camera 602 may be transmitted to the electronic device 603. The electronic device 603 may further track, for example, a person 604, based on the point cloud data of the radar 601 and the images collected by the camera 602 by using the target tracking method in this embodiment of this application.

In a possible implementation, when detecting that the person 604 illegally enters an insecure field, the electronic device 603 may display an alarm on a screen, display an alarm by voice, display an alarm by using an alarm device, or the like. This is not specifically limited in this embodiment of this application.

The following describes terms described in embodiments of this application. It may be understood that the description is intended to explain the embodiments of this application more clearly, and does not necessarily constitute a limitation on the embodiments of this application.

The camera target tracking result described in the embodiments of this application may include a target bounding box (or referred to as a visual bounding box or the like) obtained by framing a target on an image captured by the camera, other data used to calibrate the target, or the like. In a possible implementation, the camera target tracking result may further include one or more of the following: a location, a speed, or the like of the target. There may be one or more camera target tracking results. Specific content and a quantity of the camera target tracking results are not specifically limited in the embodiments of this application.

The radar target tracking result described in the embodiments of this application may include a target point cloud collected by the radar, other data used to calibrate the target, or the like. In a possible implementation, the radar target tracking result may further include one or more of the following: a location, a speed, or the like of the target. There may be one or more radar target tracking results. Specific content and a quantity of radar target tracking results are not specifically limited in the embodiments of this application.

The radar described in the embodiments of this application may include a millimeter-wave radar, an imaging radar (image radar), or the like. Compared with the millimeter-wave radar, the imaging radar can obtain more point cloud data. Therefore, when the imaging radar is used to track the target, a target size may be obtained based on the relatively large amount of point cloud data collected by the imaging radar, and then radar-camera fusion is performed with reference to the target size, to obtain more accurate target tracking compared with the millimeter-wave radar.

The camera target tracking result described in the embodiments of this application may be a target tracking result calibrated in a camera coordinate system. The radar target tracking result described in the embodiments of this application may be a target tracking result calibrated in a radar coordinate system.

The camera coordinate system described in the embodiments of this application may be a coordinate system centered on a camera. For example, in the camera coordinate system, the camera is at an origin, an x-axis is rightward, a z-axis is forward (facing a screen or a camera direction), and a y-axis is upward (not above the world but above the camera itself). In a possible implementation, the camera coordinate system may also be referred to as a visual coordinate system.

The radar coordinate system described in the embodiments of this application may be a coordinate system centered on a radar. In a possible implementation, the radar coordinate system may also be referred to as a top view coordinate system, an aerial view (bird eye view, BEV) coordinate system, or the like.

The following describes the technical solutions of this application and how to resolve the foregoing technical problems according to the technical solutions of this application in detail by using specific embodiments. The following several specific embodiments may be implemented independently or combined with each other, and same or similar concepts or processes may not be repeatedly described in some embodiments.

Figure 7:
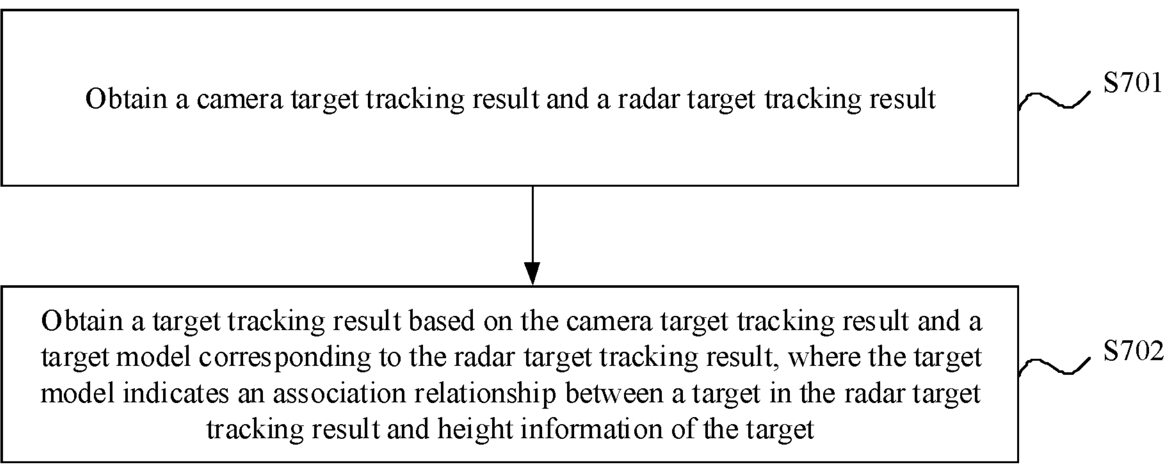
FIG. 7 is a schematic diagram of a probability height according to an embodiment of this application.

FIG. 7 is a schematic flowchart of a target tracking method according to an embodiment of this application. As shown in FIG. 7, the method includes the following steps.

S701. Obtain a camera target tracking result and a radar target tracking result.

In this embodiment of this application, a camera may be configured to photograph an image, and a radar may be configured to detect and obtain point cloud data. The camera, the radar, and a device configured to perform the target tracking method may be co-located together in one device, or may be separately independent of each other, or may be co-located in pairs in one device. This is not specifically limited in this embodiment of this application.

In a possible implementation, the camera may have a computing capability. In this case, the camera may obtain a camera target tracking result based on a photographed image, and send the camera target tracking result to the device configured to perform the target tracking method.

In a possible implementation, the radar may have a computing capability. In this case, the radar may obtain a radar target tracking result based on the point cloud data, and send the radar target tracking result to the device configured to perform the target tracking method.

In a possible implementation, the device configured to perform the target tracking method may obtain the photographed image from the camera, and obtain the point cloud data from the radar. Further, the device configured to perform the target tracking method may obtain the camera target tracking result based on the photographed image, and obtain the radar target tracking result based on the point cloud data.

In a possible understanding, the camera target tracking result may be a target tracking result obtained by using a possible camera tracking algorithm or the like, and the radar target tracking result may be a target tracking result obtained by using a possible radar tracking algorithm or the like. A specific manner of obtaining the camera target tracking result and the radar target tracking result is not limited in this embodiment of this application.

S702. Obtain a target tracking result based on the camera target tracking result and a target model corresponding to the radar target tracking result, where the target model indicates an association relationship between a target in the radar target tracking result and height information of the target.

The target model of the radar target tracking result described in this embodiment of this application indicates the association relationship between the target in the radar target tracking result and the height information of the target. For example, the target model may be a model obtained by fusing the height information of the target, location information of the target, and the like in the radar coordinate system. In a possible understanding manner, in this embodiment of this application, a relatively small amount of scattered point cloud data in the radar target tracking result may be extended to a target model with height information of a relatively large coverage area.

The camera target tracking result is usually related to a shape of the target. For example, the camera target tracking result may include a target bounding box used to frame the target, and in this embodiment of this application, the target model corresponding to the radar target tracking result is related to a height of the target, so that a range of the target detected by the radar can be effectively expanded. When target association is performed based on the camera target tracking result and the target model corresponding to the radar target tracking result, an association range of the camera target tracking result and the target model corresponding to the radar target tracking result can be effectively expanded, further, an accurate target tracking result may be obtained through association.

The target tracking result described in this embodiment of this application may include one or more of the following: a type, a location, a speed, or the like of the target. There may be one or more targets. Specific content and a quantity of the target tracking results are not specifically limited in this embodiment of this application.

In conclusion, in the target tracking method in this embodiment of this application, when the camera target tracking result is associated with the radar target tracking result, the height information of the target is introduced into the radar target tracking result. Specifically, the target model indicating the association relationship between the target in the radar target tracking result and the height information of the target may be obtained. When the camera target tracking result is associated with the radar target tracking result, the target tracking result may be obtained based on the camera target tracking result and the target model. Because the target model includes the height information of the target, a range of the target detected by the radar can be effectively expanded, and then an accurate target tracking result can be obtained through association.

Based on the embodiment corresponding to FIG. 7, in a possible implementation, before S702, the method may further include: obtaining the height information of the target based on type information of the target in the radar target tracking result; and fusing the height information of the target and the target in the radar target tracking result to obtain the target model.

For example, the target in the radar target tracking result obtained through radar detection may be classified based on a common radar classification algorithm (for example, RD-map or a micro-Doppler spectrum, and the radar classification algorithm is not specifically limited in this embodiment of this application). For example, the target may be classified based on the radar classification algorithm, and the obtained type information of the classified target includes: a vehicle (car), a pedestrian (pedestrian), an animal (animal), a bicycle (cycle), or the like.

The height information of the target may be determined based on the type information of the target. For example, the height information of the target may be estimated based on the type information of the target. Alternatively, for example, a correspondence between the type information of the target and the height information of the target may be predefined or preset, so that after the type information of the target is determined, corresponding height information may be matched in the correspondence. The height information may be a specific height value, or may be a height interval. For example, the correspondence may include a vehicle height (car height) of 0.8-1.2 meters (meter, m for short), a pedestrian height (ped height) of 1.0-1.8 m, and an animal height (animal height) of 0.4-1.0 m.

Figure 8:
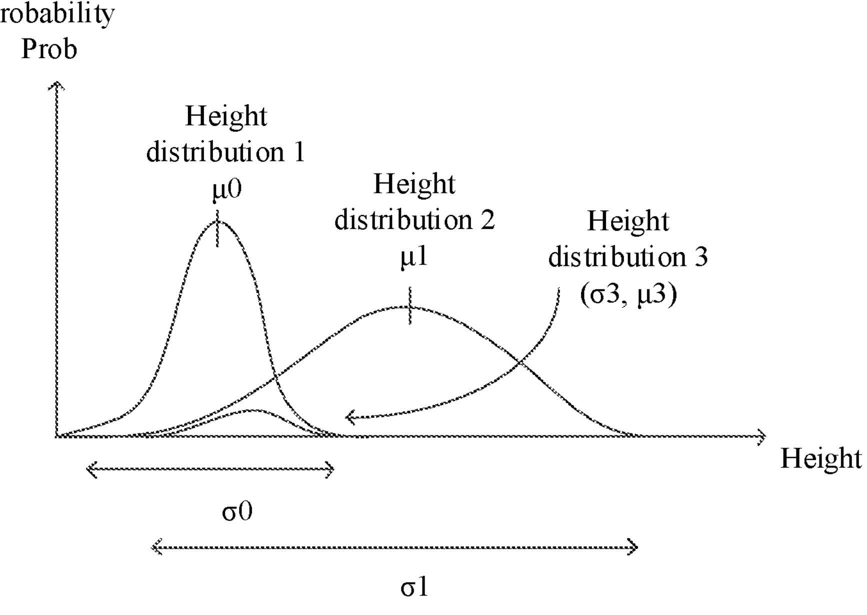
FIG. 8 is a schematic diagram of height calibration according to an embodiment of this application.

The correspondence between the type information of the target and the height information of the target may be obtained based on Gaussian distribution, statistics, machine learning, or the like. This is not specifically limited in this application. For example, FIG. 8 is a schematic diagram of a target type-probability height correspondence based on Gaussian distribution. As shown in FIG. 8, a height distribution 1, a height distribution 2, and a height distribution 3 respectively represent probability height distributions corresponding to different target types.

On the basis of the obtained height information of the target, the height information of the target and the target in the radar target tracking result can be fused to obtain the target model. For example, after the type information of the target is determined, a height value with a maximum probability or a relatively large probability may be selected from the correspondence between the type information of the target and the height information of the target, a height line segment corresponding to the height value is obtained by using the height value, and the height line segment and the location of the target in the target tracking result are fused to obtain the target model. Because the target model may be a model including a height line segment, the target model may also be referred to as a probability height model, a probability height line segment model, or the like.

Based on the embodiment corresponding to FIG. 7, in a possible implementation, S702 includes: project the target model into a camera coordinate system, to obtain a projected radar target tracking result; and obtain a target tracking result based on the camera target tracking result and the projected radar target tracking result.

In this embodiment of this application, because the target model includes the height information of the target, when the target model is projected into the camera coordinate system, it may be understood that two-dimensional height information is introduced into a one-dimensional projection plane of the camera coordinate system. In this case, a target jointly determined in the camera target tracking result and the projected radar target tracking result may be determined based on the camera target tracking result (for example, a target bounding box) and the projected radar target tracking result (for example, a line segment representing a height and a location), and the target tracking result is obtained.

In a possible implementation, the projecting the target model into the camera coordinate system includes: converting the target model into the camera coordinate system based on a preset or defined height conversion relationship, In a possible implementation, the height conversion relationship may be set or defined in advance based on an experiment or the like. After the target model is obtained, the height conversion relationship corresponding to the target model may be matched, and then the target model is converted into the camera coordinate system.

The height conversion relationship described in this embodiment of this application is used to convert the target tracking result with a height in the radar coordinate system into the camera coordinate system. Different height information corresponds to different height conversion relationships. In a possible implementation, the height conversion relationship may include a height conversion matrix, a height conversion matrix set, or the like. The height conversion relationship is not specifically limited in this embodiment of this application.

Figure 9:
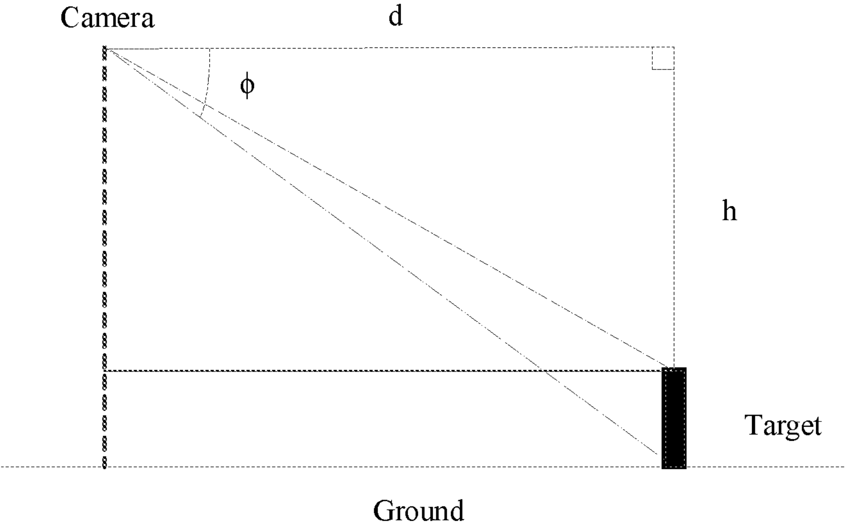
FIG. 9 is a schematic diagram of different area types according to an embodiment of this application.

For example, FIG. 9 is a schematic diagram of calibrating a height conversion relationship of a target model. As shown in FIG. 9, the target model may be a line segment with a height. It is assumed that the target model is disposed on the ground. In the camera coordinate system, different locations (for example, locations at two ends, or any location in the middle) of the line segment may correspond to different height conversion matrices. For example, the height conversion matrix may be related to a distance d and an included angle φ from the target to an origin of the camera coordinate system. A height conversion matrix may be separately constructed for a plurality of locations of the line segment. In this case, a height conversion matrix set (or referred to as a height matrix sequence) including a plurality of height conversion matrices may be used for conversion from the line segment into the camera coordinate system.

In a possible implementation, height information corresponding to different area types corresponds to different height conversion relationships.

The area type described in this embodiment of this application may be used to describe a ground type of an area in which the target is located. For example, the area type may include one or more of the following: an area with undulating ground (for example, a grassland or an undulating road surface), an area with a slope (for example, a slope), or an area with flat ground (for example, a flat road surface). In different area types, the target may be located on different ground planes, and heights of the target relative to the origin of the camera coordinate system in different areas may be different. Therefore, if a same height conversion relationship is used for a same target located in different areas, a height obtained through conversion may be inconsistent with a height of the target relative to the origin of the camera coordinate system, and subsequent radar camera fusion may be inaccurate.

Based on this, in this embodiment of this application, height information corresponding to different area types corresponds to different height conversion relationships, so that the target model can be accurately converted based on height conversion relationships of various area types.

Figures 10, 11:
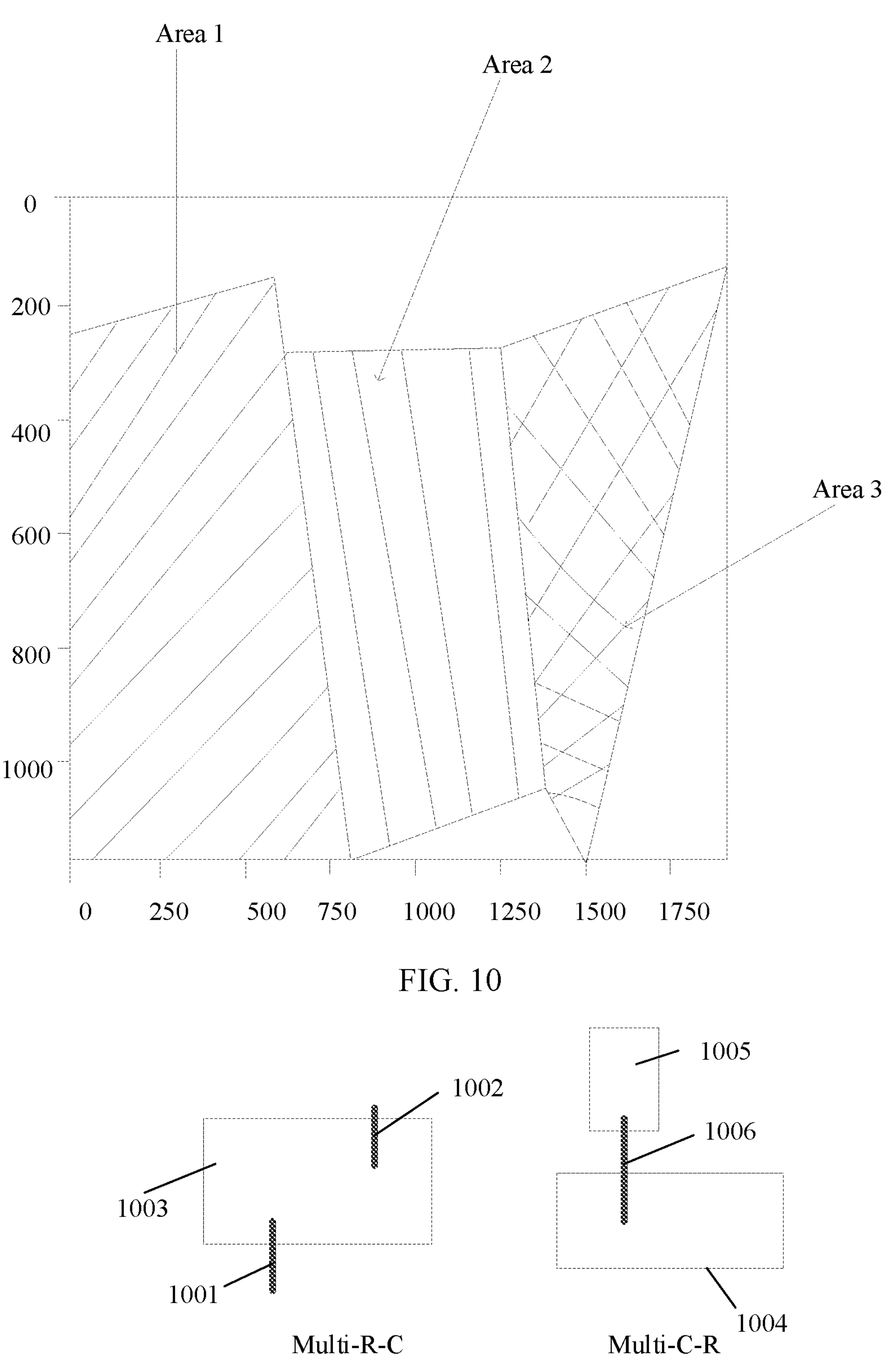
FIG. 10 is a schematic diagram of target association according to an embodiment of this application.
FIG. 11 is a schematic flowchart of a target tracking method according to an embodiment of this application.

For example, FIG. 10 is a schematic diagram of a plurality of area types included in a scenario. For example, an area 1 represents grassland, an area 2 represents a slope, and an area 3 represents a flat road surface. Same height information corresponds to different height conversion relationships in the area 1, the area 2, and the area 3. When the target model is converted into the camera coordinate system, a target area type (for example, the area 1, the area 2, or the area 3) corresponding to the target model may be determined; and the target model is converted into the camera coordinate system based on a target height conversion relationship that matches height information of the target model and that is in a height conversion relationship corresponding to the target area type. In this way, the target model can be accurately converted into the camera coordinate system by using the height conversion relationship of each area.

In a possible implementation, the obtaining a target tracking result based on the camera target tracking result and the projected radar target tracking result may include: calculating an association degree between the camera target tracking result and the projected radar target tracking result by using any association algorithm, and determining a camera target tracking result with a high association degree and the projected radar target tracking result as a same target. For example, the association algorithm includes one or more of the following: a global nearest neighbor algorithm (global nearest neighbor, GNN), a probabilistic data association (probabilistic data association, PDA), a joint probabilistic data association (joint probabilistic data association, JPDA), or an intersection over union (intersection over union, IoU).

For example, it may be determined, based on an overlapping proportion (or referred to as an intersection over union) between the camera target tracking result and the projected radar target tracking result, that the camera target tracking result and the projected radar target tracking result indicate the same target, where the overlapping proportion is greater than a first value.

A larger overlapping part between the camera target tracking result and the projected radar target tracking result (or understood as a larger overlapping proportion) may indicate that the camera target tracking result and the projected radar target tracking result point to the same target. Therefore, when the overlapping proportion between the camera target tracking result and the projected radar target tracking result is greater than or equal to the first value, it may be determined that the camera target tracking result and the projected radar target tracking result indicate the same target for association. For example, the first value may be any value between 0.5 and 1. The first value is not specifically limited in this embodiment of this application. It may be understood that, generally, in IoU calculation, the first value has confidence distribution and is stable. Therefore, when the association is performed by using IoU calculation, the first value may not need to be manually adjusted, thereby improving universality of association calculation in this embodiment of this application.

In a possible implementation, when there is one camera target tracking result and one projected radar target tracking result, in the case that the overlapping proportion between the camera target tracking result and the projected radar target tracking result is greater than the first value, it may be determined that the camera target tracking result and the projected radar target tracking result indicate the same target.

In another possible implementation, when there are a plurality of camera target tracking results and a plurality of projected radar target tracking results, one camera target tracking result and one projected radar target tracking result may be paired, an overlapping proportion between each pair of camera target tracking results and the projected radar target tracking result is calculated, and a pair of camera target tracking result and the projected radar target tracking result whose overlapping proportion is greater than or equal to the first value are determined as the same target.

In a possible implementation, if the overlapping proportion between the camera target tracking result and the projected radar target tracking result is less than or equal to the first value, it is considered that the camera target tracking result and the projected radar target tracking result correspond to different targets.

It may be understood that when the overlapping proportion is equal to the first value, it may be determined, based on an actual application scenario setting, that the camera target tracking result and the projected radar target tracking result indicate the same target; or it may be determined, based on an actual application scenario setting, that the camera target tracking result and the projected radar target tracking result indicate different targets. This is not specifically limited in this embodiment of this application.

In a possible implementation, a plurality of camera target tracking results may overlap one projected radar target tracking result (referred to as a multi-C-R association), or one camera target tracking result may overlap a plurality of projected radar target tracking results (referred to as a multi-R-C association). In the multi-C-R association or the multi-R-C association, if two calculated overlapping proportions are both greater than or equal to the first value, a plurality of camera target tracking results may be incorrectly associated as a same target, or a plurality of projected radar target tracking results may be incorrectly associated as a same target. In this case, it is further determined, based on a location and/or a speed of the overlapping target in the camera target tracking result and a location and/or a speed of the overlapping target in the radar target tracking result, whether the camera target tracking result and the projected radar target tracking result indicate the same target.

For example, when the overlapping proportion is greater than the first value, and the location and/or the speed of the overlapping target in the camera target tracking result and the location and/or the speed of the overlapping target in the projected radar target tracking result meet a preset condition, it may be determined that the camera target tracking result and the projected radar target tracking result indicate the same target. For example, the preset condition includes: A difference between the location and/or the speed of the overlapping target in the camera target tracking result and the location and/or the speed of the overlapping target in the radar target tracking result is less than a second value.

For example, FIG. 11 is a schematic diagram of multi-R-C and multi-C-R.

As shown in FIG. 11, in multi-R-C, both a projected radar target tracking result 1001 and a projected radar target tracking result 1002 overlap a camera target tracking result 1003.

In this case, if an overlapping proportion between the projected radar target tracking result 1002 and the camera target tracking result 1003 is greater than or equal to the first value, and an overlapping proportion between the projected radar target tracking result 1001 and the camera target tracking result 1003 is less than the first value, it may be determined that the projected radar target tracking result 1002 and the camera target tracking result 1003 indicate a same target, and it is determined that the projected radar target tracking result 1001 and the camera target tracking result 1003 indicate different targets.

If the overlapping proportion between the projected radar target tracking result 1002 and the camera target tracking result 1003 is greater than or equal to the first value, and the overlapping proportion between the projected radar target tracking result 1001 and the camera target tracking result 1003 is greater than or equal to the first value, it may be further determined whether a distance between the location of the target in the projected radar target tracking result 1001 and the location of the target in the camera target tracking result 1003 is greater than a distance threshold, and/or it may be further determined whether a distance between the location of the target in the projected radar target tracking result 1002 and the location of the target in the camera target tracking result 1003 is greater than the distance threshold, and/or it may be further determined whether a difference between the speed of the target in the projected radar target tracking result 1001 and the speed of the target in the camera target tracking result 1003 is greater than a speed difference threshold, and/or it may be further determined whether a difference between the speed of the target in the projected radar target tracking result 1002 and the speed of the target in the camera target tracking result 1003 is greater than the speed difference threshold. Further, when the distance between the location of the target in the projected radar target tracking result 1001 and the location of the target in the camera target tracking result 1003 is less than or equal to the distance threshold, and/or the difference between the speed of the target in the projected radar target tracking result 1001 and the speed of the target in the camera target tracking result 1003 is less than or equal to the speed difference threshold, it may be determined that the projected radar target tracking result 1001 and the camera target tracking result 1003 indicate the same target. When the distance between the location of the target in the projected radar target tracking result 1002 and the location of the target in the camera target tracking result 1003 is less than or equal to the distance threshold, and/or the difference between the speed of the target in the projected radar target tracking result 1002 and the speed of the target in the camera target tracking result 1003 is less than or equal to the speed difference threshold, it may be determined that the projected radar target tracking result 1002 and the camera target tracking result 1003 indicate the same target. In another case, it may be determined that the projected radar target tracking result 1001 and/or the projected radar target tracking result 1001 are/is not the same target as the camera target tracking result 1003.

Similarly, as shown in FIG. 11, in the multi-C-R, both a camera target tracking result 1004 and a camera target tracking result 1005 overlap a projected radar target tracking result 1006. A manner similar to that recorded in the multi-R-C may be used to determine whether the camera target tracking result 1004 or the camera target tracking result 1005 is a same target as the projected radar target tracking result 1006, and details are not described herein again.

Figure 12:
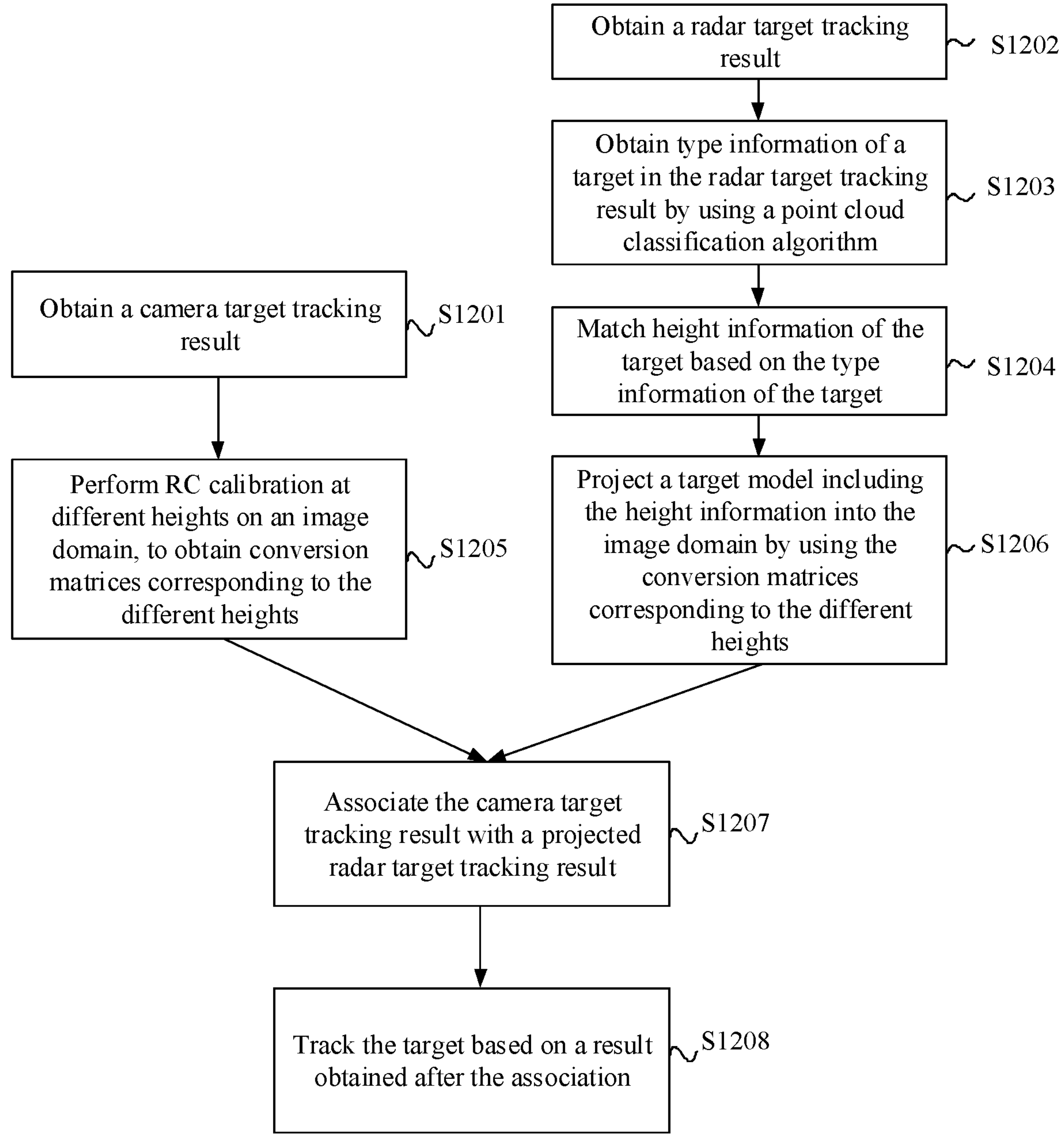
FIG. 12 is another schematic flowchart of a target tracking method according to an embodiment of this application.

For example, a device (referred to as a target tracking device subsequently), a camera, and a radar that perform the target tracking method in the embodiments of this application are three independent devices. The target tracking method in the embodiments of this application is described in detail with reference to FIG. 12. FIG. 12 is a schematic flowchart of another target tracking method according to an embodiment of this application. The method includes the following steps.

S1201. A target tracking device obtains a camera target tracking result.

In a possible scenario, a camera may be disposed in a place in which target tracking needs to be performed. The camera may photograph an image, and the target tracking device may obtain the image from the camera.

The target tracking device may perform processing such as image recognition on the image obtained from the camera, to implement bounding box tracking. A bounding box tracking result is used as a camera target tracking result.

In a possible understanding manner, the camera target tracking result may be a target bounding box (Bounding Box) used to frame a target in a camera coordinate system, and there may be one or more target bounding boxes.

S1202. The target tracking device obtains a radar target tracking result.

In a possible scenario, a radar may be disposed in the place in which target tracking needs to be performed, the radar may detect the target, and the target tracking device may obtain, from the radar, data obtained by radar detection.

The target tracking device can process the data obtained by radar detection to obtain point cloud data of the target, which is used as the radar target tracking result.

In a possible understanding manner, the radar target tracking result may be a point cloud used to calibrate the target, a quantity of point clouds corresponding to one target may be related to radar performance or the like, and there may be one or more targets.

S1203. The target tracking device obtains type information of the target in the radar target tracking result by using a point cloud classification algorithm.

For the classification algorithm and the type information of the target in this embodiment of this application, refer to the description in the term description part. Details are not described herein again.

In this embodiment of this application, the target tracking device may determine the type information of the target in the radar tracking result based on analysis of the radar target tracking result. For example, it may be determined that the target in the radar tracking result is a person and/or a vehicle. A quantity of targets and type information of the target are not limited in this embodiment of this application.

S1204. The target tracking device matches height information of the target based on the type information of the target.

For example, there are two targets, and types of the two targets are respectively a person and a vehicle. The height information of the person may be 1.0-1.8 m, and the height information of the vehicle may be 0.4-1.0 m.

S1205. The target tracking device performs RC calibration at different heights on an image domain (image domain), to obtain conversion matrices corresponding to the different heights.

In this embodiment of this application, the image domain may be an area in an image in the camera coordinate system, and corresponds to different height conversion matrices in different areas. In this way, a specific area of the target in the image may be subsequently identified, and a corresponding height conversion matrix may be selected for the target, to achieve a more accurate tracking effect.

It should be noted that S1205 may be a step performed in advance, or it may be understood that S1205 may be disposed at any position before, in the middle, or after S1201 to S1204. An execution step of S1025 in this embodiment of this application is not specifically limited.

S1206. The target tracking device projects a target model including the height information into the image domain (which may be understood as projecting the target model into the camera coordinate system) by using the conversion matrices corresponding to different heights.

For S1206 in this embodiment of this application, refer to the description of the foregoing embodiment. Details are not described herein again.

S1207. The target tracking device associates the camera target tracking result with the projected radar target tracking result.

For a specific association method in this embodiment of this application, refer to the description in the foregoing embodiment. Details are not described herein again.

In a possible implementation, a target jointly determined by using the camera target tracking result and the radar target tracking result may be obtained through association in S1207.

For example, with reference to the example in FIG. 2, when target tracking is performed based on the camera, at a location A in a place, a camera target tracking result 20 is obtained at the location A; and when target tracking is performed based on the radar, a radar target tracking result 21 is obtained at the location A. Based on the target model in this case, when the radar target tracking result is projected into the camera coordinate system, the radar target tracking result may be projected to line segment 23 in the camera coordinate system. Because the camera target tracking result 20 overlaps the line segment 23 in a relatively large proportion, it may be considered that the camera target tracking result at the location A and the radar target tracking result indicate a same target, and then the camera target tracking result and the radar target tracking result corresponding to the same target are merged to obtain a more accurate and complete tracking result. Alternatively, for example, a bottom edge of the camera target tracking result 20 may be pulled down with reference to a length of the line segment 23, to implement more accurate target determining.

It may be understood that, if there are a plurality of camera target tracking results and a plurality of radar target tracking results, the foregoing method may be separately used to associate any camera target tracking result with any radar target tracking result, so as to obtain a target tracked in both the camera target tracking result and the radar target tracking result. There may be one or more targets. It may be understood that, if the overlapping proportion between the camera target tracking result and the projected radar target tracking result is relatively small, it may be considered that a target tracked by the camera target tracking result and a target tracked by the radar target tracking result are not the same target. In a scenario in which there are a plurality of camera target tracking results and a plurality of radar target tracking results, if an overlapping proportion between one camera target tracking result and any projected radar target tracking result is relatively small, it may be determined that an error occurs in the one of the camera target tracking results, and subsequently tracking of a target corresponding to the one of the camera target tracking results may not be performed. Similarly, if an overlapping proportion between any target tracking result and one of the projected radar target tracking results is relatively small, it may be determined that an error occurs in the one of the projected radar target tracking results, and subsequently tracking of a target corresponding to the one of the projected radar target tracking results may not be performed.

S1208. The target tracking device tracks the target based on a result obtained after the association.

For example, target tracking may be separately performed on the one or more targets obtained through association. Specific implementation of target tracking is not limited in this embodiment of this application.

In a possible understanding manner, although a similar feature-level association manner (for example, using the bounding box and the height information) is used in this embodiment of this application, a basic framework uses a target-level fusion framework with better efficiency and stability (because tracking is performed at a granularity of a target), and therefore can have higher computing efficiency.

In addition, in this embodiment of this application, with reference to the height information of the target, dependency on precision of a midpoint at the bottom edge of the bounding box is greatly reduced and dependency on location precision in the radar point cloud is greatly reduced. Relatively high target tracking accuracy can still be achieved at night, when light is relatively weak, when a clutter environment is complex, or when there is undulating ground.

Refer to FIG. 12. In a possible implementation, a radar target tracking result in FIG. 12 may come from an imaging radar. Compared with a millimeter-wave radar, the imaging radar has more point cloud data. Therefore, when the imaging radar is used to track a target, a target size may be obtained based on the relatively large amount of point cloud data collected by the imaging radar. Further, in S1206, both the target size and the target model may be further projected into the camera coordinate system and a similar three-dimensional data relationship including a visual bounding box, height information, and a size may be obtained in the camera coordinate system. S1207 may be replaced with performing target association by using the visual bounding box, the height information, and the size. Exemplarily, an overlapping proportion among the visual bounding box, the height information, and the size may be calculated at the same time. When the overlapping proportion is greater than or equal to a specific value, the targets are associated as the same target. In this embodiment of this application, because the size is added, more accurate target association can be implemented compared with the millimeter-wave radar, thereby implementing more accurate target tracking.

From the foregoing descriptions of the solutions of this application, it may be understood that, to implement the foregoing functions, each device includes a corresponding hardware structure and/or software unit for performing each function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 13:
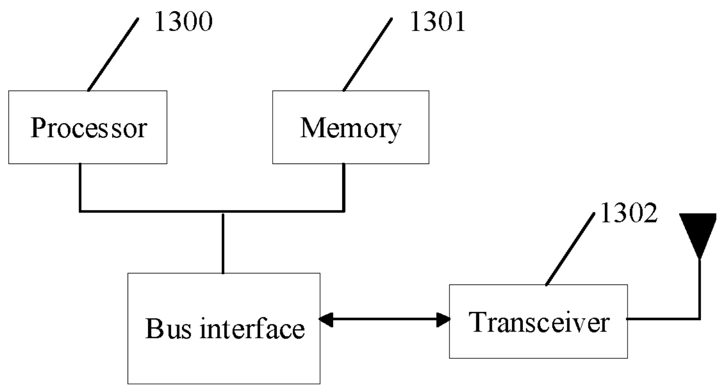
FIG. 13 is a schematic diagram of a structure of a target tracking apparatus according to an embodiment of this application.

As shown in FIG. 13, an embodiment of this application provides a target tracking apparatus. The target tracking apparatus includes a processor 1300, a memory 1301, and a transceiver 1302.

The processor 1300 is responsible for managing a bus architecture and general processing. The memory 1301 may store data used when the processor 1300 performs an operation. The transceiver 1302 is configured to receive and send data under control of the processor 1300, to perform data communication with the memory 1301.

The bus architecture may include any quantity of interconnected buses and bridges, and specifically connects together various circuits of one or more processors represented by the processor 1300 and a memory represented by the memory 1301. The bus architecture may further connect various other circuits such as a peripheral device, a voltage stabilizer, and a power management circuit. These are well known in the art, and therefore are not further described in this specification. The bus interface provides an interface. The processor 1300 is responsible for managing a bus architecture and general processing. The memory 1301 may store data used when the processor 1300 performs an operation.

The procedures disclosed in the embodiments of this application may be applied to the processor 1300, or may be implemented by the processor 1300. In an implementation process, steps of the target tracking procedure may be performed by an integrated logic circuit of hardware of the processor 1300, or by a software instruction. The processor 1300 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of the present invention. The general-purpose processor may be a microprocessor, or may be any conventional processor or the like. The steps of the method disclosed with reference to the embodiments of this application may be directly performed by a hardware processor, or may be performed by a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory 1301. The processor 1300 reads information in the memory 1301 and completes the steps of the signal processing procedure in combination with hardware of the processor 1300.

In an optional manner of this embodiment of this application, the processor 1300 is configured to read a program in the memory 1301, to perform the method procedure in S701 and S702 shown in FIG. 7 or the method procedure in S1201 to S1208 shown in FIG. 12.

Figure 14:
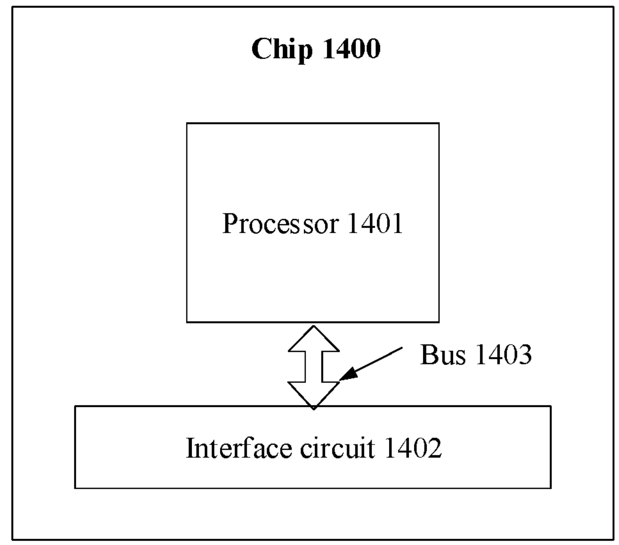
FIG. 14 is a schematic diagram of a structure of a chip according to an embodiment of this application.

FIG. 14 is a schematic diagram of a structure of a chip according to an embodiment of this application. A chip 1400 includes one or more processors 1401 and an interface circuit 1402. Optionally, the chip 1400 may further include a bus 1403. Specifically, the processor 1401 may be an integrated circuit chip and has a signal processing capability. In an implementation process, the steps of the foregoing method may be performed by an integrated logic circuit of hardware of the processor 1401, or by a software instruction. The processor 1401 may be one or more of a general-purpose processor, a digital communicator (DSP), an application-specific integrated circuit (ASIC), a field programmable gate array (FPGA), or another programmable logic device, a discrete gate or transistor logic device, a discrete hardware component, an MCU, an MPU, a CPU, or a coprocessor. The processor may implement or perform the methods and steps that are disclosed in the embodiments of this application. The general-purpose processor may be a microprocessor, or the processor may be any conventional processor or the like.

The interface circuit 1402 may send or receive data, instructions, or information. The processor 1401 may process the data, the instructions, or other information received through the interface circuit 1402, and send, through the interface circuit 1402, information obtained after processing.

Optionally, the chip further includes a memory. The memory may include a read-only memory and a random access memory, and provide operation instructions and data for the processor. A part of the memory may further include a non-volatile random access memory (NVRAM).

Optionally, the memory stores an executable software module or a data structure, and the processor may perform a corresponding operation by invoking operation instructions (the operation instructions may be stored in an operating system) stored in the memory.

Optionally, the chip may be used in the target tracking apparatus in the embodiments of this application. Optionally, the interface circuit 1402 may be configured to output an execution result of the processor 1401. For the target tracking method provided in one or more embodiments of this application, refer to the foregoing embodiments. Details are not described herein again.

It should be noted that functions corresponding to each of the processor 1401 and the interface circuit 1402 may be implemented by using a hardware design, may be implemented by using a software design, or may be implemented by using a combination of software and hardware. This is not limited herein.

Figure 15:
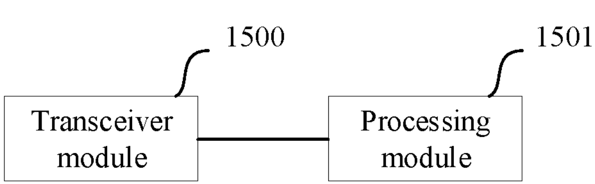
FIG. 15 is a schematic diagram of another structure of a target tracking apparatus according to an embodiment of this application.

As shown in FIG. 15, an embodiment of this application provides a target tracking apparatus. The apparatus includes a transceiver module 1500 and a processing module 1501.

The transceiver module 1500 is configured to obtain a camera target tracking result and a radar target tracking result.

The processing module 1501 is configured to obtain a target tracking result based on the camera target tracking result and a target model corresponding to the radar target tracking result, where the target model indicates an association relationship between a target in the radar target tracking result and height information of the target.

In a possible implementation, the processing module is further configured to obtain the height information of the target based on type information of the target in the radar target tracking result; and the processing module is further configured to fuse the height information of the target and the target in the radar target tracking result to obtain the target model.

In a possible implementation, there is a predefined or preset correspondence between the type information of the target and the height information of the target.

In a possible implementation, the processing module is specifically configured to: project the target model into a camera coordinate system, to obtain a projected radar target tracking result; and obtain a target tracking result based on the camera target tracking result and the projected radar target tracking result.

In a possible implementation, the processing module is specifically configured to convert the target model into the camera coordinate system based on a preset or defined height conversion relationship, where different height information corresponds to different height conversion relationships, and the height conversion relationship is used to convert a target tracking result with a height in a radar coordinate system into the camera coordinate system.

In a possible implementation, height information corresponding to different area types corresponds to different height conversion relationships.

In a possible implementation, the area type includes one or more of an area with undulating ground, an area with a slope, or an area with flat ground.

In a possible implementation, the processing module is specifically configured to determine a target area type corresponding to the target model; and convert the target model into the camera coordinate system based on a target height conversion relationship that matches height information of the target model and that is in a height conversion relationship corresponding to the target area type.

In a possible implementation, the processing module is specifically configured to determine, based on an overlapping proportion between the camera target tracking result and the projected radar target tracking result, that the camera target tracking result and the projected radar target tracking result indicate a same target, where the overlapping proportion is greater than a first value.

In a possible implementation, the processing module is specifically configured to: when the overlapping proportion is greater than the first value, and a location and/or a speed of an overlapping target in the camera target tracking result and a location and/or a speed of the overlapping target in the projected radar target tracking result meet a preset condition, determine that the camera target tracking result and the projected radar target tracking result indicate the same target.

In a possible implementation, the preset condition includes: A difference between the location and/or the speed of the overlapping target in the camera target tracking result and the location and/or the speed of the overlapping target in the radar target tracking result is less than a second value.

In a possible implementation, the radar target tracking result is from an imaging radar, and the target model further includes size information of the target.

In a possible implementation, the camera target tracking result includes a target bounding box, and the radar target tracking result includes a target point cloud.

In a possible implementation, functions of the transceiver module 1500 and the processing module 1501 shown in FIG. 15 may be executed by the processor 1300 by running a program in the memory 1301, or may be independently executed by the processor 1300.

Figure 16:
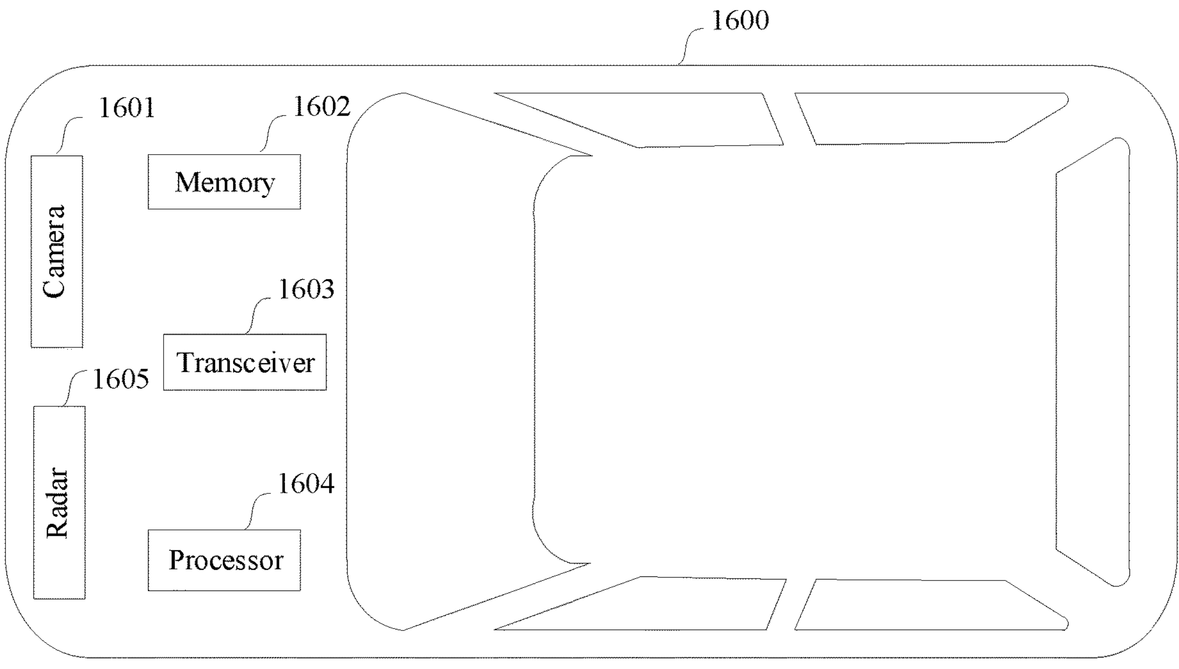
FIG. 16 is a schematic diagram of a structure of a vehicle according to an embodiment of this application.

As shown in FIG. 16, this application provides a vehicle. The apparatus includes at least one camera 1601, at least one memory 1602, at least one transceiver 1603, at least one processor 1604, and a radar 1605.

The camera 1601 is configured to obtain an image, where the image is used to obtain a camera target tracking result.

The radar 1605 is configured to obtain a target point cloud, where the target point cloud is used to obtain a radar target tracking result.

The memory 1602 is configured to store one or more programs and data information, where the one or more programs include instructions.

The transceiver 1603 is configured to perform data transmission with a communications device in the vehicle, and is configured to perform data transmission with a cloud.

The processor 1604 is configured to: obtain the camera target tracking result and the radar target tracking result; and obtain a target tracking result based on the camera target tracking result and a target model corresponding to the radar target tracking result, where the target model indicates an association relationship between a target in the radar target tracking result and height information of the target.

In some possible implementations, aspects of the target tracking method provided in the embodiments of this application may be further implemented in a form of a program product, and the program product includes program code. When the program code is run on a computer device, the program code is used to enable the computer device to perform steps in the target tracking method according to various example implementations of this application described in this specification.

The program product may be any combination of one or more readable media. The readable medium may be a readable signal medium or a readable storage medium. For example, the readable storage medium may be, but is not limited to, an electrical, a magnetic, an optical, an electromagnetic, an infrared, or a semiconductor system, apparatus or device, or any combination thereof. More specific examples (non-exhaustive list) of the readable storage medium include: an electrical connection having one or more conducting wires, a portable disk, a hard disk, a random access memory (RAM), a read-only memory (ROM), an erasable programmable read-only memory (EPROM or flash memory), an optical fiber, a portable compact disc read-only memory (CD-ROM), an optical storage component, a magnetic storage component, or any appropriate combination thereof.

The program product used for target tracking according to an implementation of this application may use a portable compact disc read-only memory (CD-ROM) and include program code, and may run on a server device. However, the program product in this application is not limited thereto. In this document, the readable storage medium may be any tangible medium that includes or stores a program, and the program may be used by or in combination with a communication transmission apparatus or component.

The readable signal medium may include a data signal propagated in a baseband or as a part of a carrier, where the data signal carries readable program code. The propagated data signal may be in a plurality of forms, including but not limited to an electromagnetic signal, an optical signal, or any appropriate combination thereof. The readable signal medium may alternatively be any readable medium other than the readable storage medium. The readable medium may send, propagate, or transmit a program used by or in combination with a periodic network action system, apparatus, or device.

The program code included in the readable medium may be transmitted by using any appropriate medium, including but not limited to a wireless medium, a wired medium, an optical cable, an RF medium, or any appropriate combination thereof.

The program code used to execute the operations of this application may be written in any combination of one or more program design languages. The program design languages include object-oriented program design languages such as Java and C++, and further include a conventional procedural program design language such as a "C" language or a similar program design language. The program code may be completely executed on a computing device of a user, partially executed on user equipment, executed as an independent software package, partially executed on a computing device of a user and partially executed on a remote computing device, or completely executed on a remote computing device or server. When the program code is executed on the remote computing device, the remote computing device may be connected to the user's computing device by using any type of network, including a local area network (LAN) or a wide area network (WAN), or may be connected to an external computing device.

An embodiment of this application further provides a computing device readable storage medium for a target tracking method, that is, content is not lost after a power failure. The storage medium stores a software program, including program code. When the program code is run on a computing device, the software program can implement any one of the foregoing target tracking solutions in the embodiments of this application when being read and executed by one or more processors.

An embodiment of this application further provides an electronic device. When each function module is obtained through division based on each corresponding function, the electronic device includes a processing module, configured to support a target tracking apparatus in performing the steps in the foregoing embodiment, for example, may perform operations of S701 to S702, or another process of the technology described in this embodiment of this application.

All related content of each step in the foregoing method embodiments may be cited in function descriptions of a corresponding functional module. Details are not described herein again.

Certainly, the target tracking apparatus includes but is not limited to the units and modules listed above. In addition, functions that the foregoing functional modules can specifically implement include but are not limited to the functions corresponding to the method steps in the foregoing examples. For detailed descriptions of another unit of the electronic device, refer to detailed descriptions of method steps corresponding to the unit, and details are not described herein again in this embodiment of this application.

When an integrated unit is used, the electronic device in the foregoing embodiments may include a processing module, a storage module, and a communications module. The storage module is configured to store program code and data of the electronic device. The communications module is configured to support communication between the electronic device and another network entity, to implement functions such as calling, data exchange, and Internet access of the electronic device.

The processing module is configured to control and manage an action of the electronic device. The processing module may be a processor or a controller. The communications module may be a transceiver, an RF circuit, a communications interface, or the like. The storage module may be a memory.

Further, the electronic device may further include an input module and a display module. The display module may be a screen or a display. The input module may be a touchscreen, a voice input apparatus, a fingerprint sensor, or the like.

The foregoing describes this application with reference to the block diagrams and/or flowcharts of the method, the apparatus (system), and/or the computer program product in the embodiments of this application. It should be understood that a block of the block diagrams and/or flowcharts and a combination of blocks in the block diagrams and/or flowcharts, can be implemented by using computer program instructions. These computer program instructions may be provided to a processor of a general-purpose computer, a processor of a dedicated computer, or another programmable data processing apparatus to produce a machine, so that the instructions executed by the processor of the computer and/or the another programmable data processing apparatus create a method for implementing a specific function/action in the block in the flowcharts and/or block diagrams.

Correspondingly, this application may further be implemented by using hardware and/or software (including firmware, resident software, microcode, and the like). Still further, this application may be in a form of a computer program product on a computer-usable or computer-readable storage medium. The computer program product has computer-usable or computer-readable program code implemented in the medium, so that the computer-usable or computer-readable is used by an instruction execution system or used in combination with an instruction execution system. In the context of this application, the computer-usable or computer-readable medium may be any medium, and may include, store, communicate, transmit, or transfer a program, for use by an instruction execution system, apparatus, or device or used in combination with an instruction execution system, apparatus, or device.

This application describes a plurality of embodiments in detail with reference to a plurality of flowcharts. However, it should be understood that the flowcharts and related descriptions of corresponding embodiments thereof are merely examples for ease of understanding, and shall not constitute any limitation on this application. Each step in each flowchart does not necessarily need to be performed. For example, some steps may be skipped. In addition, an execution sequence of each step is not fixed, and is not limited to that shown in the figure. The execution sequence of each step is determined based on a function and internal logic of the step.

A plurality of embodiments described in this application may be arbitrarily combined, or steps may intersect with each other for execution. An execution sequence of the embodiments or an execution sequence of the steps of the embodiments is not fixed, and is not limited to that shown in the figure. The execution sequence of the embodiments and a cross execution sequence of the steps of the embodiments should be determined by using functions and internal logic of the embodiments and the steps.

Although this application is described with reference to specific features and all the embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A target tracking method, comprising:

obtaining a camera target tracking result and a radar target tracking result;

determining a classification type of a target in the radar target tracking result by using a radar classification algorithm;

obtaining height information of the target based on the classification type of the target in the radar target tracking result, wherein there is a predefined or preset correspondence between each classification type and a respective height value or interval, and wherein a height value or interval that corresponds to the classification type of the target in the radar target tracking result according to the predefined or preset correspondence is obtained as the height information of the target;

fusing the height information of the target and the target in the radar target tracking result to obtain a target model; and obtaining a target tracking result based on the camera target tracking result and the target model corresponding to the radar target tracking result, wherein the target model indicates an association relationship between the target in the radar target tracking result and the height information of the target.

2. The method according to claim 1, wherein the obtaining a target tracking result based on the camera target tracking result and the target model corresponding to the radar target tracking result comprises:

projecting the target model into a camera coordinate system to obtain a projected radar target tracking result; and obtaining the target tracking result based on the camera target tracking result and the projected radar target tracking result.

3. The method according to claim 2, wherein the projecting the target model into a camera coordinate system comprises:

converting the target model into the camera coordinate system based on a preset or defined height conversion relationship, wherein different height information corresponds to different height conversion relationships, and the height conversion relationship is used to convert a target tracking result with a height in a radar coordinate system into the camera coordinate system.

4. The method according to claim 3, wherein height information corresponding to different area types corresponds to different height conversion relationships.

5. The method according to claim 4, wherein the area type comprises one or more of an area with undulating ground, an area with a slope, or an area with flat ground.

6. The method according to claim 3, wherein the converting the target model into the camera coordinate system based on a preset or defined height conversion relationship comprises:

determining a target area type corresponding to the target model; and converting the target model into the camera coordinate system based on a target height conversion relationship that matches height information of the target model and that is in a height conversion relationship corresponding to the target area type.

7. The method according to claim 2, wherein the obtaining a target tracking result based on the camera target tracking result and the projected radar target tracking result comprises:

determining, based on an overlapping proportion between the camera target tracking result and the projected radar target tracking result, that the camera target tracking result and the projected radar target tracking result indicate a same target, wherein the overlapping proportion is greater than a first value.

8. The method according to claim 7, wherein the determining, based on an overlapping proportion between the camera target tracking result and the projected radar target tracking result, that the camera target tracking result and the projected radar target tracking result indicate a same target comprises:

when the overlapping proportion is greater than the first value, and at least one of a location or a speed of an overlapping target in the camera target tracking result and at least one of a location or a speed of the overlapping target in the projected radar target tracking result meet a preset condition, determining that the camera target tracking result and the projected radar target tracking result indicate the same target.

9. The method according to claim 8, wherein the preset condition comprises:

a difference between the at least one of the location or the speed of the overlapping target in the camera target tracking result and at least one of the location or the speed of the overlapping target in the radar target tracking result is less than a second value.

10. The method according to claim 1, wherein the radar target tracking result is obtained from an imaging radar, and the target model further comprises size information of the target.

11. The method according to claim 1, wherein the camera target tracking result comprises a target bounding box, and the radar target tracking result comprises a target point cloud.

12. An apparatus, comprising:

at least one processor; and one or more memories coupled to the at least one processor and storing programming instructions for execution by the at least one processor to cause the apparatus to:

obtain a camera target tracking result and a radar target tracking result;

determine a classification type of a target in the radar target tracking result by using a radar classification algorithm;

obtain height information of the target based on the classification type of the target in the radar target tracking result, wherein there is a predefined or preset correspondence between each classification type and a respective height value or interval, and wherein a height value or interval that corresponds to the classification type of the target in the radar target tracking result according to the predefined or preset correspondence is obtained as the height information of the target;

fuse the height information of the target and the target in the radar target tracking result to obtain a target model; and obtain a target tracking result based on the camera target tracking result and the target model corresponding to the radar target tracking result, wherein the target model indicates an association relationship between a target in the radar target tracking result and height information of the target.

13. The apparatus according to claim 12, wherein the obtain a target tracking result based on the camera target tracking result and the target model corresponding to the radar target tracking result comprises:

project the target model into a camera coordinate system to obtain a projected radar target tracking result; and obtain the target tracking result based on the camera target tracking result and the projected radar target tracking result.

14. The apparatus according to claim 13, wherein the project the target model into a camera coordinate system comprises:

convert the target model into the camera coordinate system based on a preset or defined height conversion relationship, wherein different height information corresponds to different height conversion relationships, and the height conversion relationship is used to convert a target tracking result with a height in a radar coordinate system into the camera coordinate system.

15. The apparatus according to claim 14, wherein height information corresponding to different area types corresponds to different height conversion relationships.

16. The apparatus according to claim 15, wherein the area type comprises one or more of an area with undulating ground, an area with a slope, or an area with flat ground.

17. The apparatus according to claim 13, wherein the obtain a target tracking result based on the camera target tracking result and the projected radar target tracking result comprises:

determine, based on an overlapping proportion between the camera target tracking result and the projected radar target tracking result, that the camera target tracking result and the projected radar target tracking result indicate a same target, wherein the overlapping proportion is greater than a first value.

18. The apparatus according to claim 17, wherein the determine, based on an overlapping proportion between the camera target tracking result and the projected radar target tracking result, that the camera target tracking result and the projected radar target tracking result indicate a same target comprises:

when the overlapping proportion is greater than the first value, and at least one of a location or a speed of an overlapping target in the camera target tracking result and at least one of a location or a speed of the overlapping target in the projected radar target tracking result meet a preset condition, determine that the camera target tracking result and the projected radar target tracking result indicate the same target.

19. The apparatus according to claim 18, wherein the preset condition comprises:

a difference between the at least one of the location or the speed of the overlapping target in the camera target tracking result and at least one of the location or the speed of the overlapping target in the radar target tracking result is less than a second value.

20. One or more non-transitory computer-readable media storing computer instructions, that when executed by one or more processors, cause a computing device to perform operations comprising:

obtaining a camera target tracking result and a radar target tracking result;

determining a classification type of a target in the radar target tracking result by using a radar classification algorithm;

obtaining height information of the target based on the classification type of the target in the radar target tracking result, wherein there is a predefined or preset correspondence between each classification type and a respective height value or interval, and wherein a height value or interval that corresponds to the classification type of the target in the radar target tracking result according to the predefined or preset correspondence is obtained as the height information of the target;

fusing the height information of the target and the target in the radar target tracking result to obtain a target model; and obtaining a target tracking result based on the camera target tracking result and the target model corresponding to the radar target tracking result, wherein the target model indicates an association relationship between the target in the radar target tracking result and the height information of the target.

* * * * *